United States Patent
Alsubai et al.

(10) Patent No.: US 11,392,841 B2
(45) Date of Patent: Jul. 19, 2022

(54) SYSTEM TO MONITOR AND PROCESS WATER-RELATED DATA

(71) Applicant: Hartford Fire Insurance Company, Hartford, CT (US)

(72) Inventors: Saleh Ahmed Alsubai, West Hartford, CT (US); Satish K Kasala, Avon, CT (US); Susan A. Rickard, West Suffield, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 1046 days.

(21) Appl. No.: 15/789,006

(22) Filed: Oct. 20, 2017

(65) Prior Publication Data

US 2019/0122129 A1  Apr. 25, 2019

(51) Int. Cl.
*G06N 5/04* (2006.01)
*G06N 20/00* (2019.01)

(52) U.S. Cl.
CPC .............. *G06N 5/04* (2013.01); *G06N 5/047* (2013.01); *G06N 20/00* (2019.01)

(58) Field of Classification Search
CPC ........... G06N 5/04; G06N 20/00; G06N 5/047
See application file for complete search history.

(56) References Cited

U.S. PATENT DOCUMENTS

| | | | |
|---|---|---|---|
| 7,610,210 B2 | 10/2009 | Helitzer et al. | |
| 8,072,322 B1 | 12/2011 | Howard | |
| 8,515,788 B2 | 8/2013 | Tracey et al. | |
| 10,489,863 B1* | 11/2019 | Matheson | H04L 67/32 |
| 2007/0038563 A1* | 2/2007 | Ryzerski | G06Q 20/102 705/40 |
| 2013/0325519 A1 | 12/2013 | Tracey et al. | |
| 2014/0167969 A1* | 6/2014 | Wedig | G08B 25/007 340/584 |
| 2016/0163177 A1 | 6/2016 | Klicpera | |
| 2016/0241988 A1* | 8/2016 | Slevin | H04Q 9/00 |

(Continued)

OTHER PUBLICATIONS

Mounce et al., "Sensor-Fusion of Hydraulic Data for Burst Detection and Location in a Treated Water Distribution System," in 4.3 Info. Fusion 217-29 (2003). (Year: 2003).*

*Primary Examiner* — Kamran Afshar
*Assistant Examiner* — Ryan C Vaughn
(74) *Attorney, Agent, or Firm* — Buckley, Maschoff & Talwalkar LLC

(57) ABSTRACT

A plurality of water-related sensors may each include an environmental characteristic detection element, a power source, and a communication device to transmit data associated with water-related data at a site. A water impact data store may contain electronic records associated with prior water-related events at other sites along with water-related sensor location data for those sites, and a third-party information interface may receive third-party information. An enterprise analytics platform may automatically analyze the electronic records in the water impact data store to create a predictive analytics algorithm. The data associated with potential water-related data at the site and the third-party information may then be automatically analyzed, in substantially real-time, using the predictive analytics algorithm, and a result of the analysis may then be transmitted (e.g., to a party associated with the site and/or an on-site water shut-off valve).

23 Claims, 19 Drawing Sheets

(56) References Cited

U.S. PATENT DOCUMENTS

| | | |
|---|---|---|
| 2017/0030528 A1 | 2/2017 | Dietzen et al. |
| 2017/0058493 A1* | 3/2017 | Jones |
| 2017/0225336 A1* | 8/2017 | Deyle .................. G08B 13/196 |
| 2017/0292725 A1* | 10/2017 | Conley ................ G05B 19/048 |
| 2018/0268313 A1* | 9/2018 | Baxter .................. G06Q 40/08 |
| 2019/0296547 A1* | 9/2019 | Kelly ..................... H04L 67/12 |

* cited by examiner

SYSTEM TO MONITOR AND PROCESS WATER-RELATED DATA

FIELD

The present invention relates to computer systems and, more particularly, to computer systems associated with monitoring and/or processing water-related data (e.g., associated with a construction site).

BACKGROUND

An enterprise may want to monitor and/or process water-related data. For example, a general contractor might want to receive an alert message when a pipe has broken and is flooding a construction site (e.g., during the weekend or at night when no workers are present to witness the accident). Similarly, an enterprise might want to be informed when a roof begins to leak, flood waters have entered a building site, etc. Manually placing water sensors based on an expert's knowledge and then interpreting data from those sensors, however, can be an expensive and error-prone process. For example, it might not be immediately obvious that an unexplained drop in temperature in one area of a construction site is being caused by a broken faucet. In some cases, water flow rates and/or rates-of-change associated with water flow might be utilized to detect potential problems and/or to formulate a course of action to limit damage. Note, however, that normal water usage patterns may vary considerably (e.g., substantially more water might normally be used during the day as compared to an overnight period), making it difficult to set or program appropriate "thresholds" to trigger an alert message. As a result, improved ways to facilitate a monitoring and/or processing of water-related data may be desired.

SUMMARY

According to some embodiments, systems, methods, apparatus, computer program code and means may facilitate a monitoring and/or processing of water-related data. In some embodiments, a plurality of water-related sensors may each include an environmental characteristic detection element, a power source, and a communication device to transmit data associated with water at a site. A water impact data store may contain electronic records associated with prior water-related events at other sites along with water-related sensor location data for those sites, and a third-party information interface may receive third-party information. An enterprise analytics platform may automatically analyze the electronic records in the water impact data store to create a predictive analytics algorithm. The data associated with water at the site and the third-party information may then be automatically analyzed, in substantially real-time, using the predictive analytics algorithm, and a result of the analysis may then be transmitted (e.g., to a party associated with the site or an on-site water shut-off valve).

Some embodiments provide: means for collecting, from a plurality of water-related sensors, data associated with water at the site via a communication network, wherein each water-related sensor includes: (i) an environmental characteristic detection element to sense an environmental characteristic, (ii) a power source, and (iii) a communication device, coupled to the environmental characteristic detection element and the power source, to transmit the data associated with water; means for storing, in a water impact data store, electronic records associated with prior water-related events at other sites along with water-related sensor location data for those sites; means for receiving, via a third-party information interface, third-party information; means for automatically analyzing, by a computer processor of an enterprise analytics platform, the electronic records in the water impact data store to create a predictive analytics algorithm; means for automatically analyzing, by the computer processor of the enterprise analytics platform in substantially real-time, the data associated with water at the site and the third-party information using the predictive analytics algorithm; and means for transmitting, from the enterprise analytics platform, an indication of a result of the analysis.

A technical effect of some embodiments of the invention is an improved, secure, and computerized method to facilitate a monitoring and/or processing of water-related data. With these and other advantages and features that will become hereinafter apparent, a more complete understanding of the nature of the invention can be obtained by referring to the following detailed description and to the drawings appended hereto.

DETAILED DESCRIPTION

The present invention provides significant technical improvements to facilitate a monitoring and/or processing of water-related data, predictive water-related data modeling, and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the areas of water monitoring and/or processing by providing benefits in data accuracy, data availability, and data integrity, and such advances are not merely a long-standing commercial practice. The present invention provides improvement beyond a mere generic computer implementation as it involves the processing and conversion of significant amounts of data in a new beneficial manner as well as the interaction of a variety of specialized client and/or third party systems, networks and subsystems. For example, in the present invention information may be processed, forecast, and/or predicted via an analytics engine and results may then be analyzed efficiently to evaluate the potential for water damage at a site, thus improving the overall performance of an enterprise system, including message storage requirements and/or bandwidth considerations (e.g., by reducing a number of messages that need to be transmitted via a network). Moreover, embodiments associated with predictive models might further improve predictions of contractor claims, resource allocation decisions, reduce errors in templates, etc.

An enterprise, such as an employer, may want to monitor and/or process water-related data. Note that water damage losses can be substantial during a construction project. Water damage may occur from water entering a building envelope or from internal building release. Damage can include ruined finished floors and damaged equipment caused by water delivery and drainage system failures. Examples of such failures include manufacturer product defects, flawed workmanship (e.g., installing a pipe join improperly), improper supervision, frozen pipes, accidental sprinkler system discharges, unsecured water sources (e.g., roof or windows), vandalism, etc. It can be difficult to monitor a site for these types of potential water damage in an accurate and efficient manner. As a result, improved ways to facilitate a monitoring and/or processing of water-related data may be desired.

Figure 1:
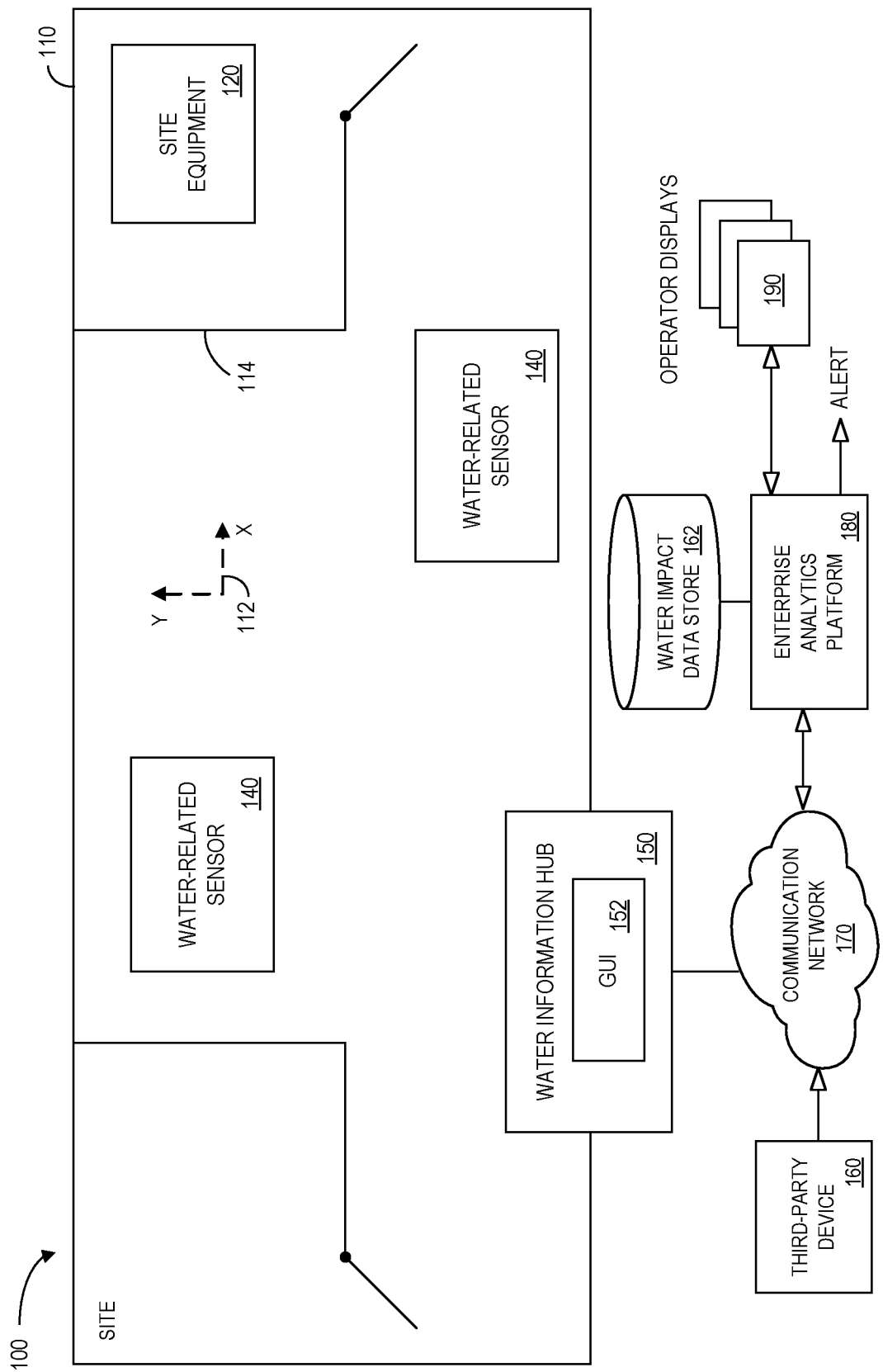
FIG. 1 is block diagram of a system according to some embodiments of the present invention.

FIG. 1 is block diagram of a system 100 associated with a site 110 where water-sensitive site equipment 120 (e.g., electronic devices, communication systems, etc.) may be located according to some embodiments of the present invention. The site 110 might be associated with, for example, a construction or renovation project and may include windows, doors, interior walls 114, etc. In some embodiments, the system 100 includes a water information hub 150 that may receive information from a plurality of water-related sensors 140 (described with respect to FIG. 4). Note that the site equipment 120 and water-related sensors 140 might be located at various locations within the site 110 (e.g., as indicated by axis 112).

According to some embodiments, the water information hub 150 exchanges data with an enterprise analytics platform via a communication network 170. For example, a Graphical User Interface ("GUI") 152 or other module of the water information hub 150 might transmit information via the Internet to facilitate a rendering of an interactive graphical operator interface display 190 and/or the creation of electronic alert messages, automatically created site recommendations, etc. According to some embodiments, the water information hub 150 may instead store this information in a local database. Note that the enterprise analytics platform 180 may also receive third-party data from a third-party device 160 (e.g., historical or current weather information).

The water information hub 150 and/or enterprise analytics platform 180 may receive a request for a display from a requestor device. For example, a general contractor might use his or her smartphone to submit the request to the water information hub 150. Responsive to the request, the water information hub 150 might access information from the enterprise analytics platform 180 (e.g., associated with water monitoring over a period of time). The water information hub 150 and/or enterprise analytics platform 180 may then use the GUI 152 to render operator displays 190. According to some embodiments, an operator may access secure site 110 information through a validation process that may include a user identifier, password, biometric information, device identifiers, geographic authentication processes, etc. According to some embodiments, the enterprise analytics platform 180 may further access electronic records from a water impact data store 162. The water impact data store 162 might, for example, store information about prior water-related results associated with other construction sites.

The water information hub 150 and/or enterprise analytics platform 180 might be, for example, associated with a Personal Computer ("PC"), laptop computer, smartphone, an enterprise server, a server farm, and/or a database or similar storage devices. The water information hub 150 and/or enterprise analytics platform 180 may, according to some embodiments, be associated with an insurance provider.

One function of the water information hub 150 may be locally collect information from the water-related sensors 140 via a wireless WI-FI® protocol network and then forward that information (or a summary of the information) to the enterprise analytics platform 180 via the Internet or cellular data network. If the water-related sensors 140 can communicate directly with the enterprise analytics platform 180, a water information hub 150 might not be required. According to some embodiments, an "automated" enterprise analytics platform 180 may facilitate the provision of potential water-related information to an operator. For example, the water information hub 150 may automatically generate and transmit electronic alert messages (e.g., when a water event occurs) and/or site remediation recommendations (e.g., "water to the fourth floor should be turned off immediately"). As used herein, the term "automated" may refer to, for example, actions that can be performed with little (or no) intervention by a human.

As used herein, devices, including those associated with the enterprise analytics platform 180 and any other device described herein may exchange information via any communication network 170 which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a BLUETOOTH® protocol network, a wireless LAN network, and/or an Internet Protocol ("IP") network such as the Internet, an intranet, or an extranet. Note that any devices described herein may communicate via one or more such communication networks.

The water information hub 150 and/or enterprise analytics platform 180 may store information into and/or retrieve information from the water impact data store 162. The water impact data store 162 might be associated with, for example, a contractor, a building owner, a leasee, an insurance company, an underwriter, or a claim analyst and might also store data associated with past and current insurance claims (e.g., water damage loss claims). The water impact data store 162 may be locally stored or reside remote from the enterprise analytics platform 180. As will be described further below, the water impact data store 162 may be used by the enterprise analytics platform to generate and/or calculate water-related data. Note that in some embodiments, a third-party information service may communicate directly with the water information hub 150 and/or enterprise analytics platform 180. According to some embodiments, the water information hub 150 communicates information associated with a simulator and/or a claims system to a remote operator and/or to an automated system, such as by transmitting an electronic file or template to an underwriter device, an insurance agent or analyst platform, an email server, a workflow management system, a predictive model, a map application, etc.

Although a single water information hub 150 and enterprise analytics platform 180 is shown in FIG. 1, any number of such devices may be included. Moreover, various devices described herein might be combined according to embodiments of the present invention. For example, in some embodiments, the water information hub 150, enterprise analytics platform 180, and/or third-party device 160 might be co-located and/or may comprise a single apparatus.

Figure 2:
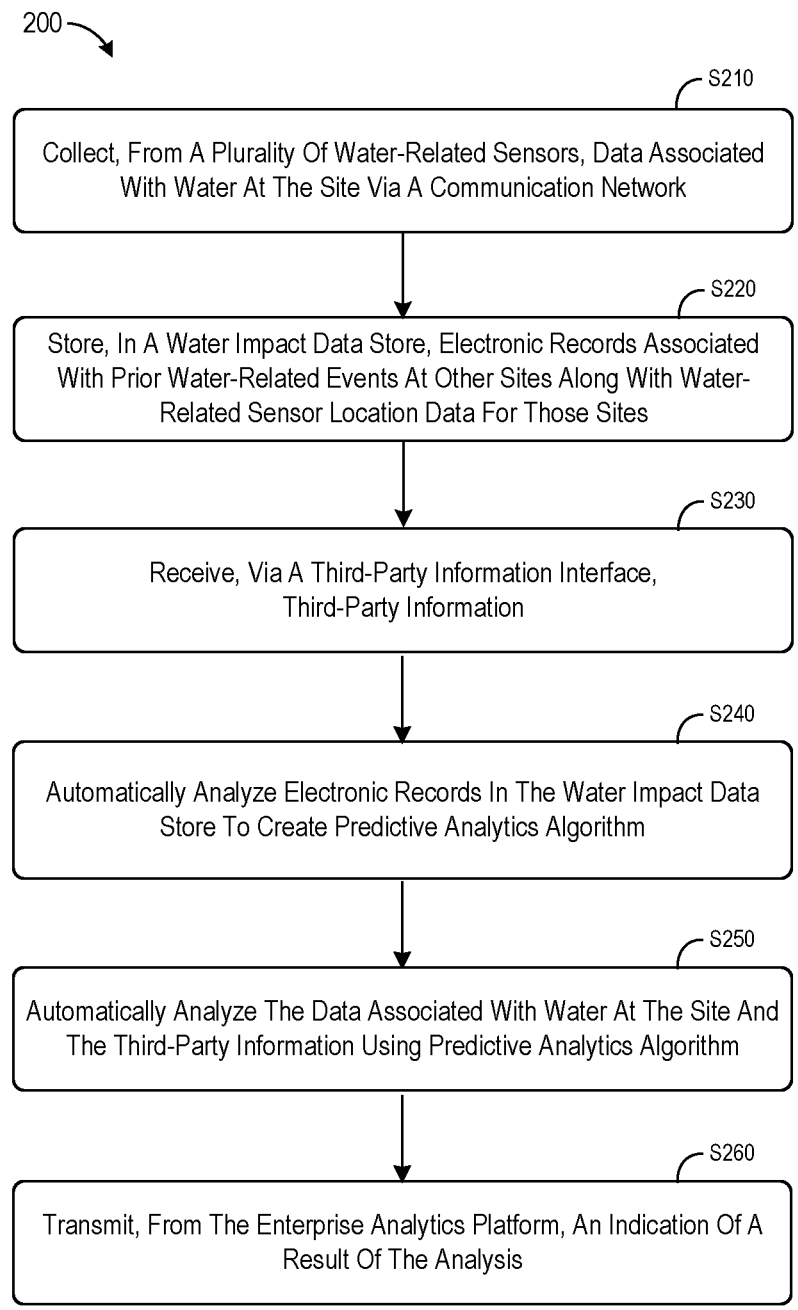
FIG. 2 illustrates a method that might be performed in accordance with some embodiments.

Note that the system 100 of FIG. 1 is provided only as an example, and embodiments may be associated with additional elements or components. According to some embodiments, the elements of the system 100 facilitate an exchange of information. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, the system may collect, from a plurality of water-related sensors, data associated with water at the site via a communication network. As described with respect to FIG. 4, each water-related sensor may include: (i) an environmental characteristic detection element to sense an environmental characteristic, (ii) a power source, and (iii) a communication device to transmit the data associated with water. Note that different water-related sensors might sense different environmental characteristics. For example, a system might include three sensors that each sense a different characteristic, such as moisture, water flowing through a pipe (including the rate of water flow, the rate-of-change of the water flow, etc.), a temperature, a thermal image, mold, an image captured by a camera, video streamed from a camera, audio information detected by a microphone, a water flow volume or rate determined by a smart water meter, etc.

At S220, the system may store, in a water impact data store, electronic records associated with prior water-related events at other sites along with water-related sensor location data for those sites. For example, the electronic records might be associated with data recorded from the other sites along with water damage insurance claim information. Moreover, the stored information may include what types of water-related sensors were installed, where those sensors were located (e.g., which floor and/or office), etc. At S230, third party information may be received via a third-party information interface. Third-party information might be associated with, for example, historic data (e.g., flood information, precipitation data, hurricane information, earthquake data), governmental information (e.g., wind zone maps and tornado warnings), etc. and/or current data (e.g., a weather forecast).

At S240, a computer processor of an enterprise analytics platform may automatically analyze the electronic records in the water impact data store to create a predictive analytics algorithm. According to some embodiments, the enterprise analytics platform is associated with a cloud-based computing architecture. Moreover, the predictive analytics algorithm might be associated with, for example, cognitive learning, pattern recognition, an early detection algorithm, a risk analysis, a risk score, etc.

At S250, the computer processor of the enterprise analytics platform may automatically analyze, in substantially real-time, the data associated with water at the site and the third-party information using the predictive analytics algorithm. At S260, the enterprise analytics platform may transmit an indication of a result of the analysis. For example, the indication transmitted by the enterprise analytics platform might comprise an electronic alert signal (e.g., in the form of an automated telephone call, an email message, a text message, etc.). According to some embodiments, the electronic alert signal includes a potential cause of a water event and/or a recommended remedial action. Moreover, in some embodiments the electronic alert signal is transmitted to an on-site water shut-down valve (e.g., to automatically turn off water to a building or a particular floor of a building).

Figure 3:
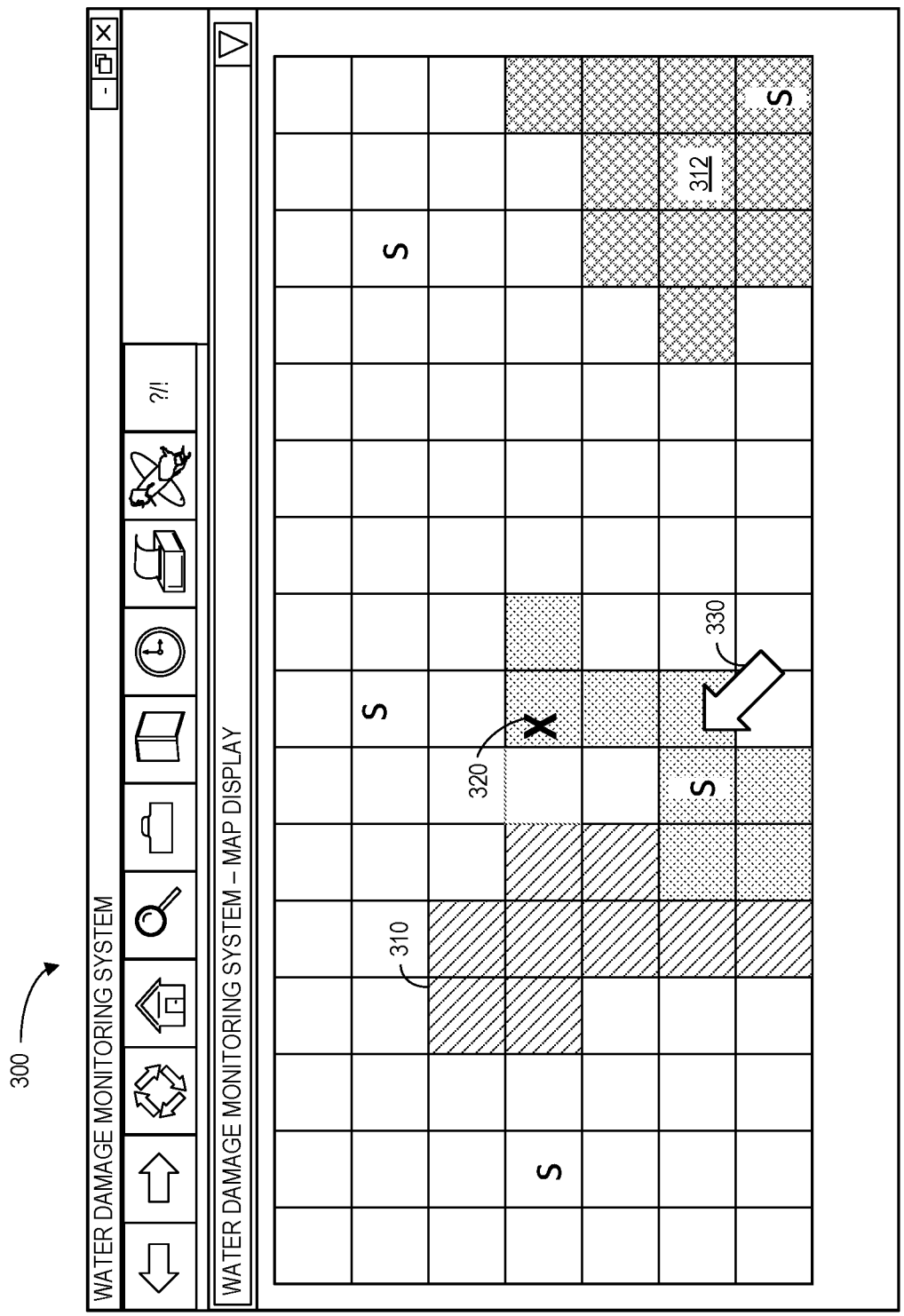
FIG. 3 illustrates an interactive operator display in accordance with some embodiments.

FIG. 3 illustrates an interactive operator display 300 in accordance with some embodiments. The display 300 includes a map rendering including areas 310, 312 that signify particular levels of potential water damage. In the example of FIG. 3, a first area 310 (e.g., near particular site equipment) might represent a potentially expensive amount of water damage. Note that the display 300 may facilitate an understanding of how different potential sources of water might be implicated. According to some embodiments, the display 300 may further include an icon 320 ("X") associated with an occurrence of a water event (e.g., a location from where it is predicted that the water originates). In some embodiments, an operator of the display 300 may use a computer pointer 330 to select an area to receive more detailed information about water-related data associated with that location. According to some embodiments, the display 300 further includes indications of water-related sensors ("S") that are positioned in various locations.

Figure 4:
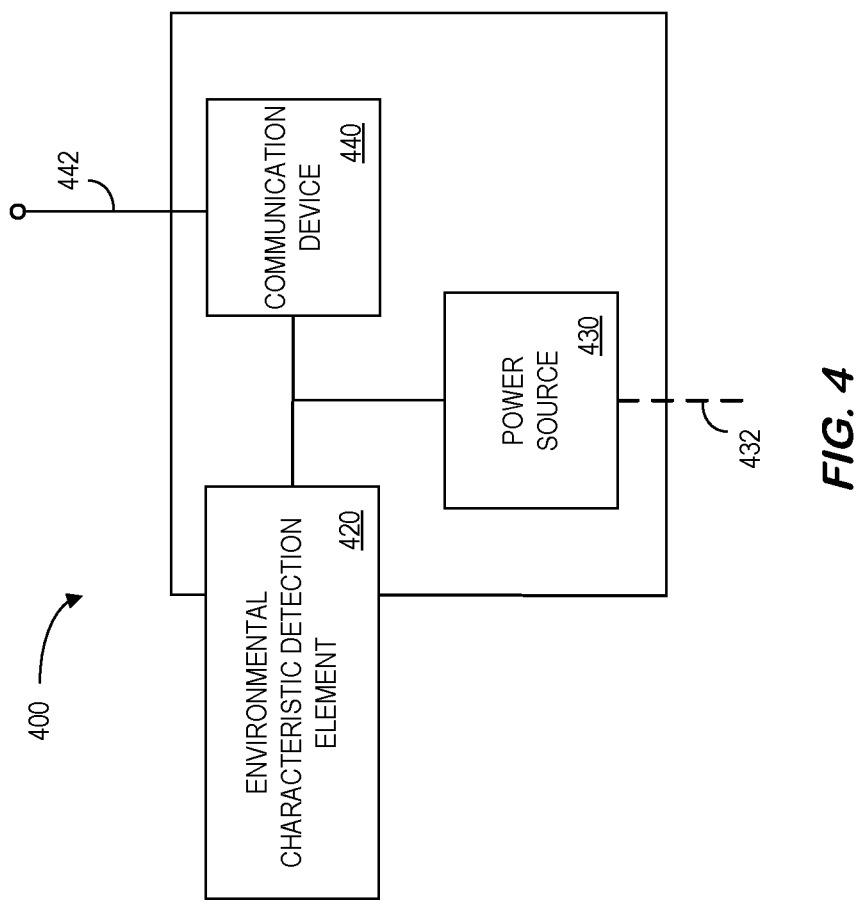
FIG. 4 is a block diagram of a water-related sensor according to some embodiments.

FIG. 4 is a block diagram of a water-related sensor 400 according to some embodiments. The water-related sensor 400 (and other water-related sensors) may be used to collect data about water-related information (e.g., indicating potential water damage or destruction). The water-related sensor 400 might include, for example, an environmental characteristic detection element 420 to sense moisture, water flow, temperature, moisture, humidity, etc., a power source 430 (e.g., associated with a battery, a re-chargeable battery with an 8 hour runtime, and/or an Alternating Current ("AC") power adapter 432), and a communication device 440 (e.g., with a wireless antenna 442), coupled to the environmental characteristic detection element 420 and the power source 430, to transmit data about water-related data. As used herein, the sensor 400 may be stationary if it is not typically to move between locations (although the sensor 400 might be occasionally moved from one location to another).

Figure 5:
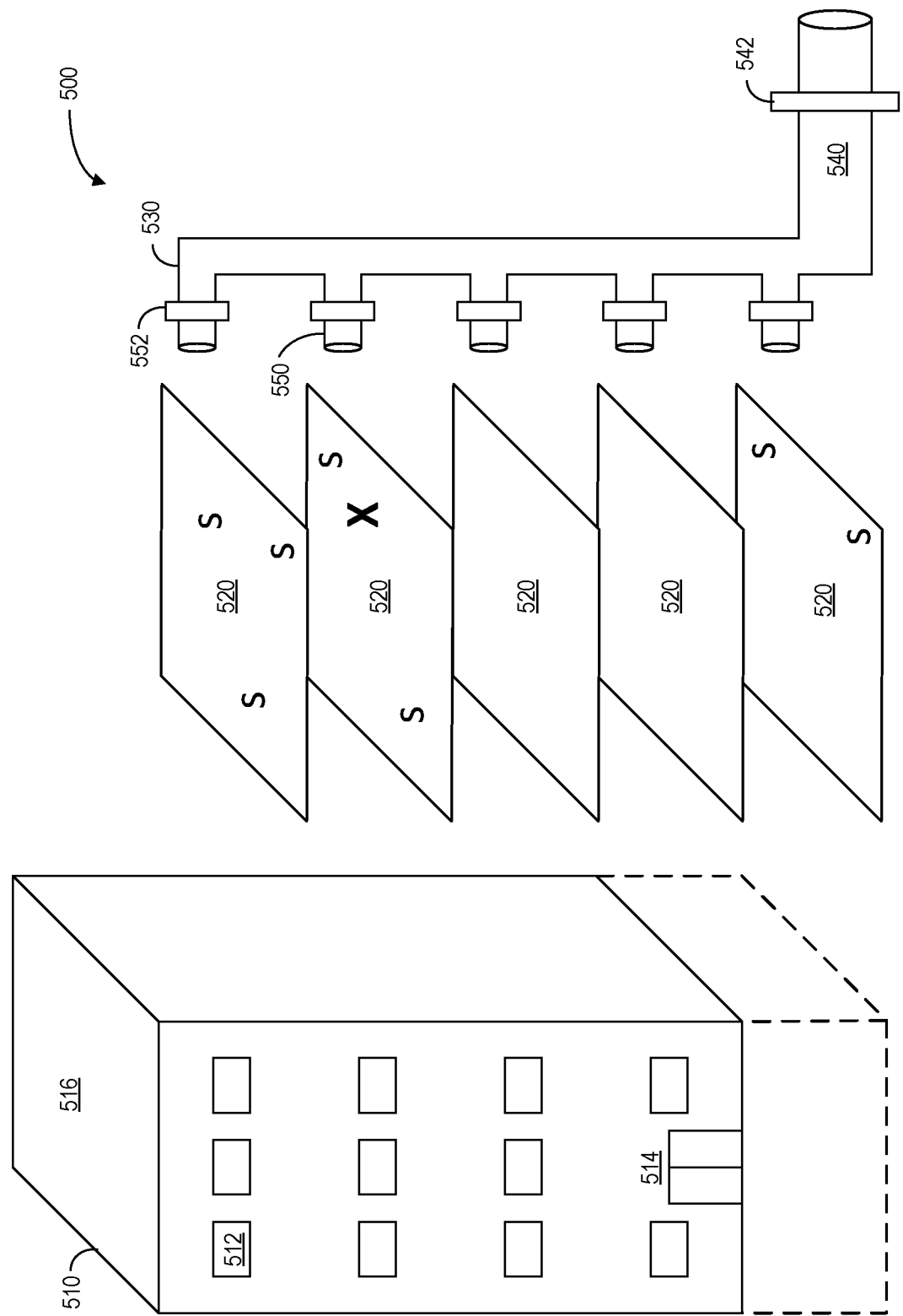
FIG. 5 is an example of site information according to some embodiments.

FIG. 5 is an example of site information 500 according to some embodiments. The site information 500 might be associated with, for example, a multi-floor building construction site including window data 512, door data 514, roof data 516, etc. Note that because water tends to travel downward, a higher level floor might be associated with greater risk as compared to a lower level floor or the basement (illustrated with dashed lines in FIG. 5). The information 500 might also include floor-by-floor blueprint data 520, including the location of electrical wires, water-related sensors ("S"), predicted or past water events ("X"), interior walls, flooring materials, etc. The information 500 may further include plumbing data 530 including pipes 550 on each floor of the building 510 and a main pipe 540 to or from the building 510. Note that water meters or shut-off valves 542, 552 might report information and/or be controlled by an enterprise analytics platform. In addition to the site information 500 illustrated in FIG. 5, embodiments might include other types of data including a construction schedule (when are workers present, when are floor completed), a security schedule (when are guards present), fire protection data (sprinkler head locations), etc.

According to some embodiments, a water flow sensor will be placed on the main pipe 550 feeding the floor (instead of the main pipe 540 feeding the building 510). Moisture sensors (which may be mobile and moved based to higher risk sections) may be placed on the ground of the floor in the corners of each room. Several temperature sensors might be fixed to the unfinished internal walls (preferably near plumbing joints). These temperature sensors may also be mobile and moved based on risk sections. According to some embodiments, a moisture sensor and a mold sensor may comprise part of a single unit.

Figure 6:
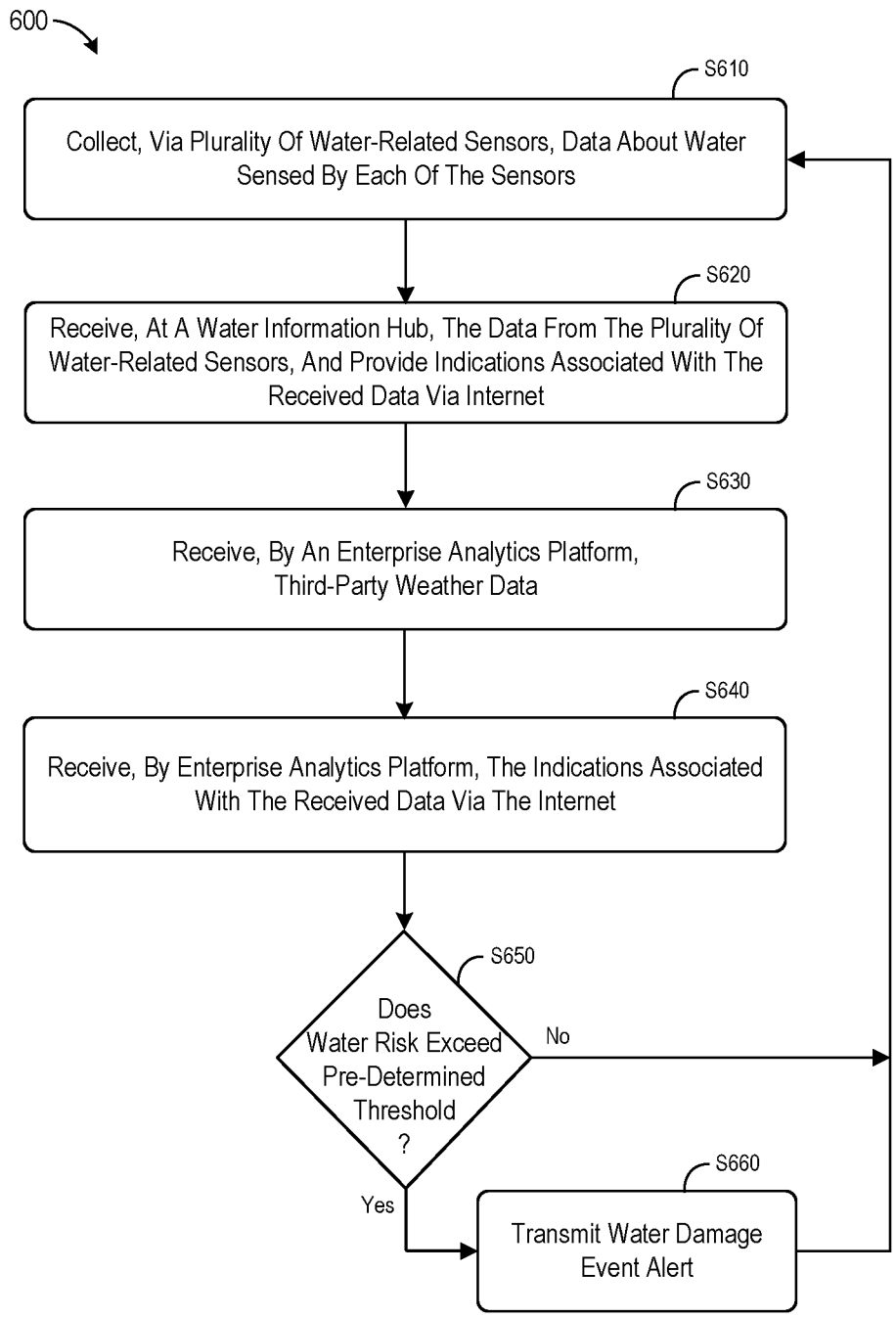
FIG. 6 illustrates an alert method that might be performed in accordance with some embodiments.

FIG. 6 illustrates an alert method 600 that might be performed in accordance with some embodiments. At S610, data associated with water sensed by each of a plurality of water-related sensors may be collected. At S620, a water information hub may receive data from the plurality of water-related sensors and the plurality of mobile water-related sensors. The water information hub may also provide indications associated with the received data via a communication network (e.g., via the Internet to a cloud-based application). At S630, third-party weather data are received by an enterprise analytics platform.

At S640, the enterprise analytics platform may receive the indications associated with the received data via the Internet. The enterprise analytics platform may analyze the received indications to determine water-related risk information for each of a plurality of locations within a site of an enterprise (e.g., to facilitate rendering of an interactive graphical operator interface that displays a map-based presentation of the water-related information for each of the plurality of locations). At S650, the enterprise analytics platform may automatically determine if water damage risk exceeds a pre-determined threshold. If the threshold is not exceeded at S650, the process may continue at S610 (e.g., collecting data). If the threshold is exceeded at S650, the enterprise analytics platform may automatically generate and transmit an electronic alert message at S660 based on the water damage risk information and may include a potential cause of a water event, along with an indication of a remedial action. For example, the enterprise analytics platform might recommend that water be turned off for a particular floor of the building. Instead of a pre-determined threshold, the process at S650 might dynamically analyze the data searching for unusual levels of moisture and/or conditions outside of a normal range of conditions.

Figure 7:
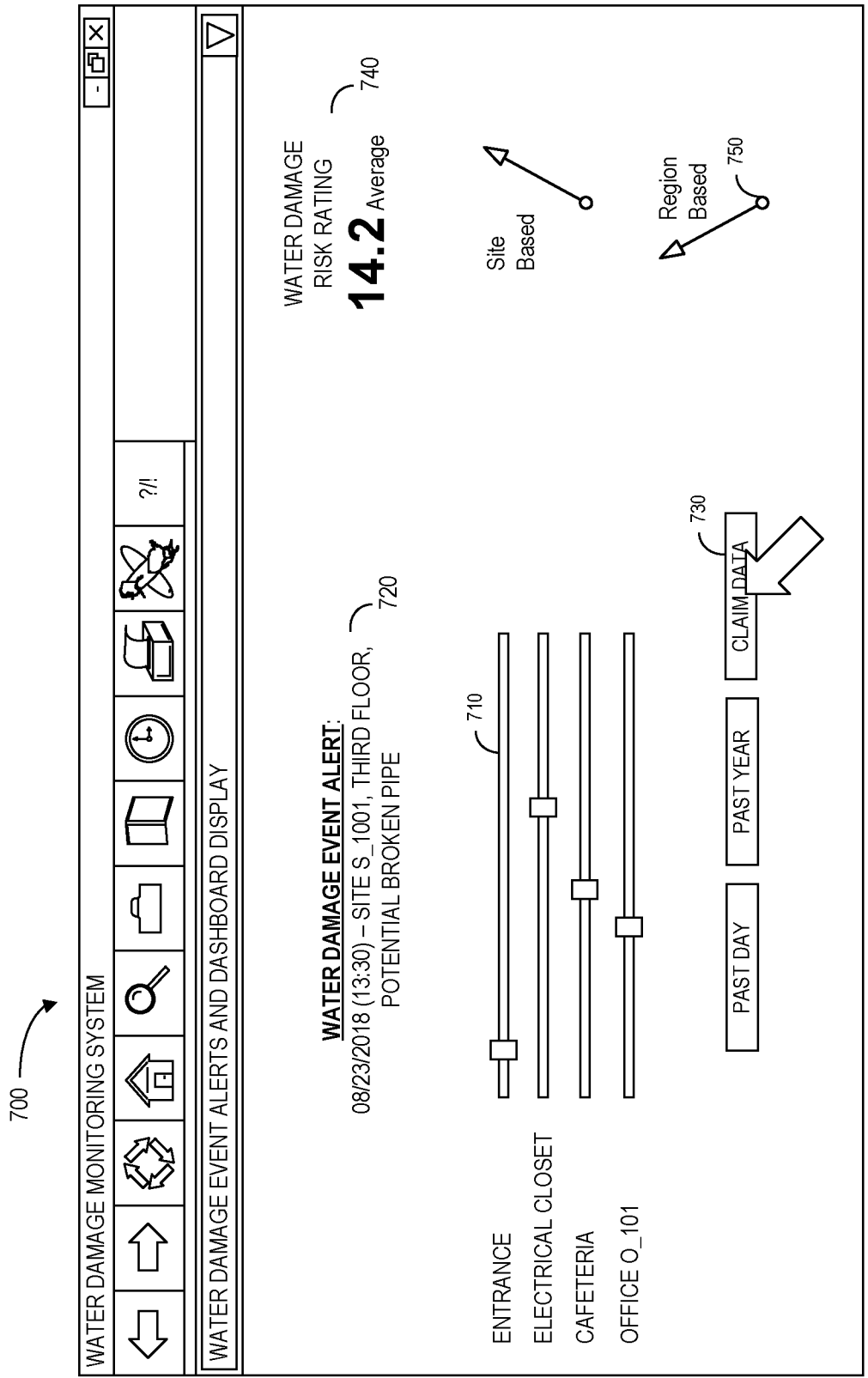
FIG. 7 illustrates an alert and dashboard display in accordance with some embodiments.

In some embodiments, an enterprise analytics platform may store water-related information representing a period of time (e.g., data representing the previous year). Moreover, the water-related information representing the period of time might be used to calculate a water damage risk rating for the enterprise (e.g., a site might be classified as "moderately risky"). FIG. 7 illustrates an alert and dashboard display 700 that includes water-related data 710 for a plurality of site locations in accordance with some embodiments. The display 700 also includes an example of an alert message 720 that might be automatically transmitted to a contractor and operator selectable options 730 (e.g., to view data associated with a particular time period, water damage claim data, etc.). According to some embodiments, the display may further include an overall water damage risk rating 740 and/or classification (e.g., "average") and/or dashboard-type display elements 750 (e.g., site-based and/or region-based display dials).

Figure 8:
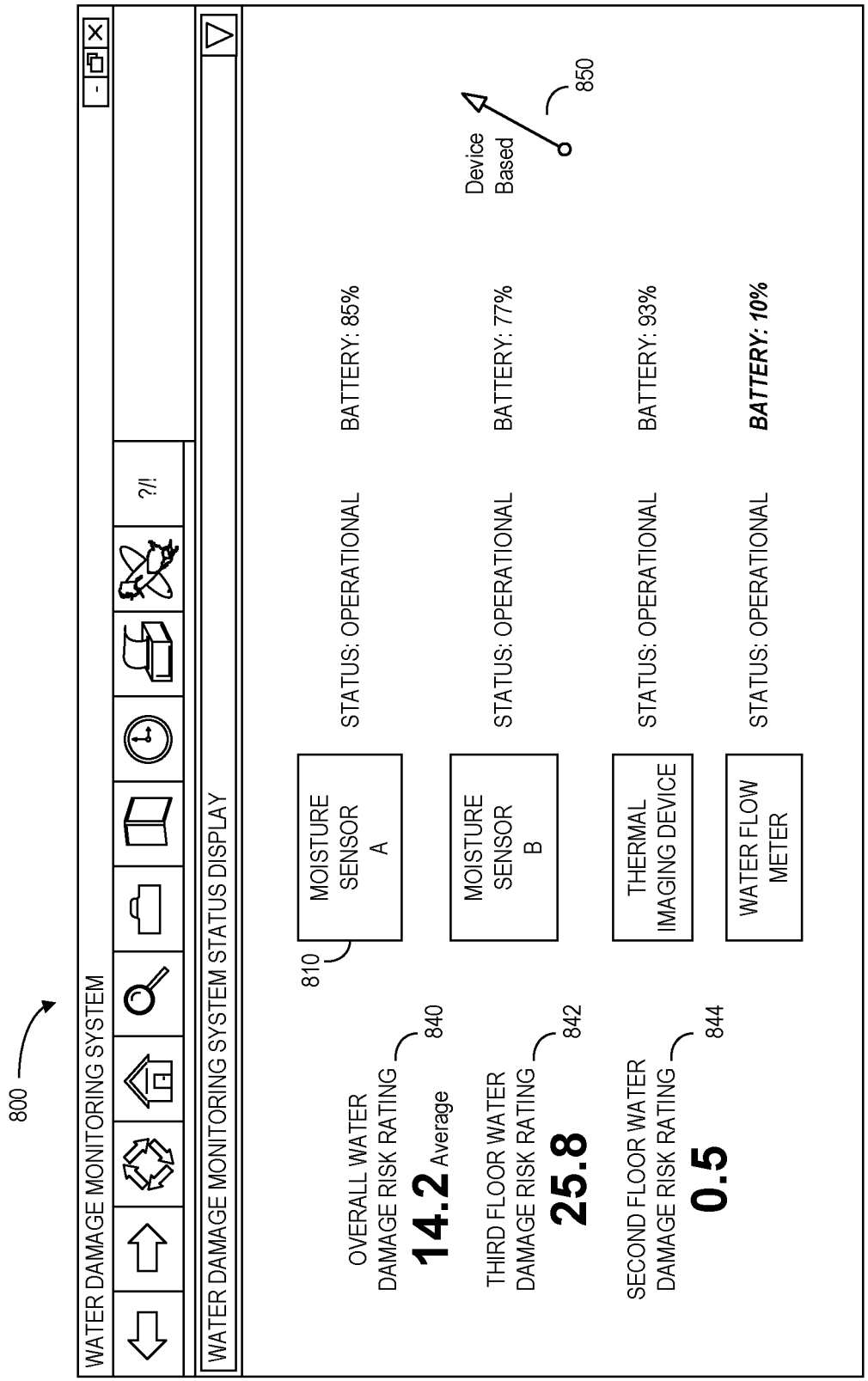
FIG. 8 illustrates a water monitoring system status display according to some embodiments.

FIG. 8 illustrates a system status display 800 that includes both an overall water damage risk rating 840 and ratings 842, 844 associated with sub-regions, zones, business units, etc. of the enterprise. The system status display 800 also includes data about each individual water-related sensor, such as a sensor status (e.g., operational, failed, mobile, etc.) and a current battery power level associated with that sensor. The system status display 800 further includes device-level dashboard information 850 that may, according to some embodiments, be selected by an operator to see a greater level of detail about that particular device. According to some embodiments, the display 800 (or the device itself) might generate an alarm when a sensor device is not operating properly (e.g., by flashing a light, emitting a beep, etc.).

Embodiments described herein may be associated with various types of enterprises. For example, a museum, a large retail store or shopping mall, a warehouse, a library, a chemical laboratory, a factory, etc. might all be interested in monitoring and/or processing water-related information.

Figure 9:
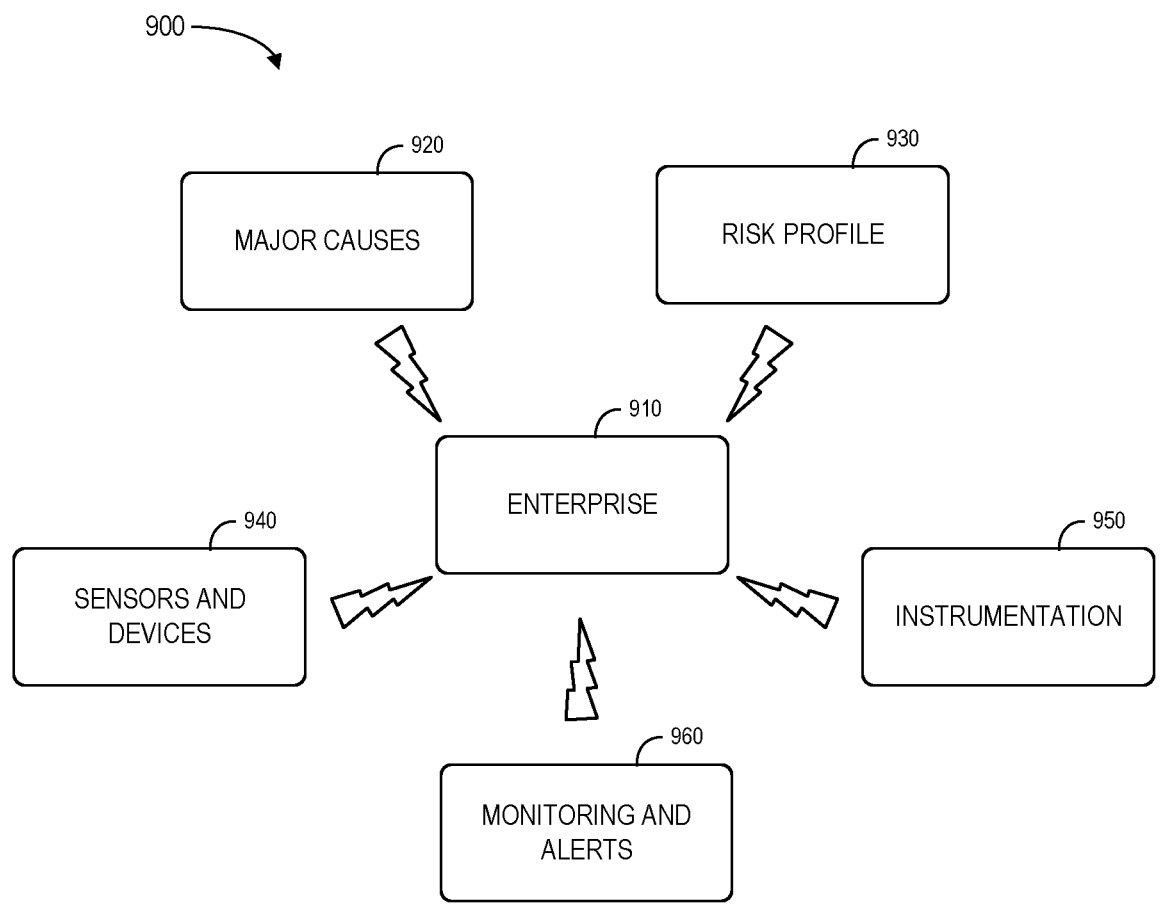
FIG. 9 is a construction or renovation water damage overview according to some embodiments of the present invention.

FIG. 9 is a construction or water damage overview 900 according to some embodiments. An enterprise 910 (e.g., an insurance company, building owner, contractor, etc.) may implement loss control and/or proactive water leak detection to decrease claims payout and/or improve customer service. Note that the major causes 920 of water damage might include flawed workmanship, weather, product defects, improper supervision, theft, sabotage, etc. The risk profile 930 might be associated with, for example, an insurance premium and/or duration until a building is 75% complete and "buttoned-up" (with at least temporary heating). The sensors and devices 940 might include moisture sensors, temperature sensors, mold sensors, flow sensors and valves, cloud connectivity, long battery life, on-site WI-FI® protocol, etc. The instrumentation 950 might include moisture sensors in unfinished areas, temperature sensors in exposed areas, water pressure valves in secondary pipes, etc. The monitoring and alerts 960 might include real-time alerts, sensor statistics, cognitive learning, pattern recognition, early detection algorithms, remote shut-down via mobile application, etc.

Figure 10:
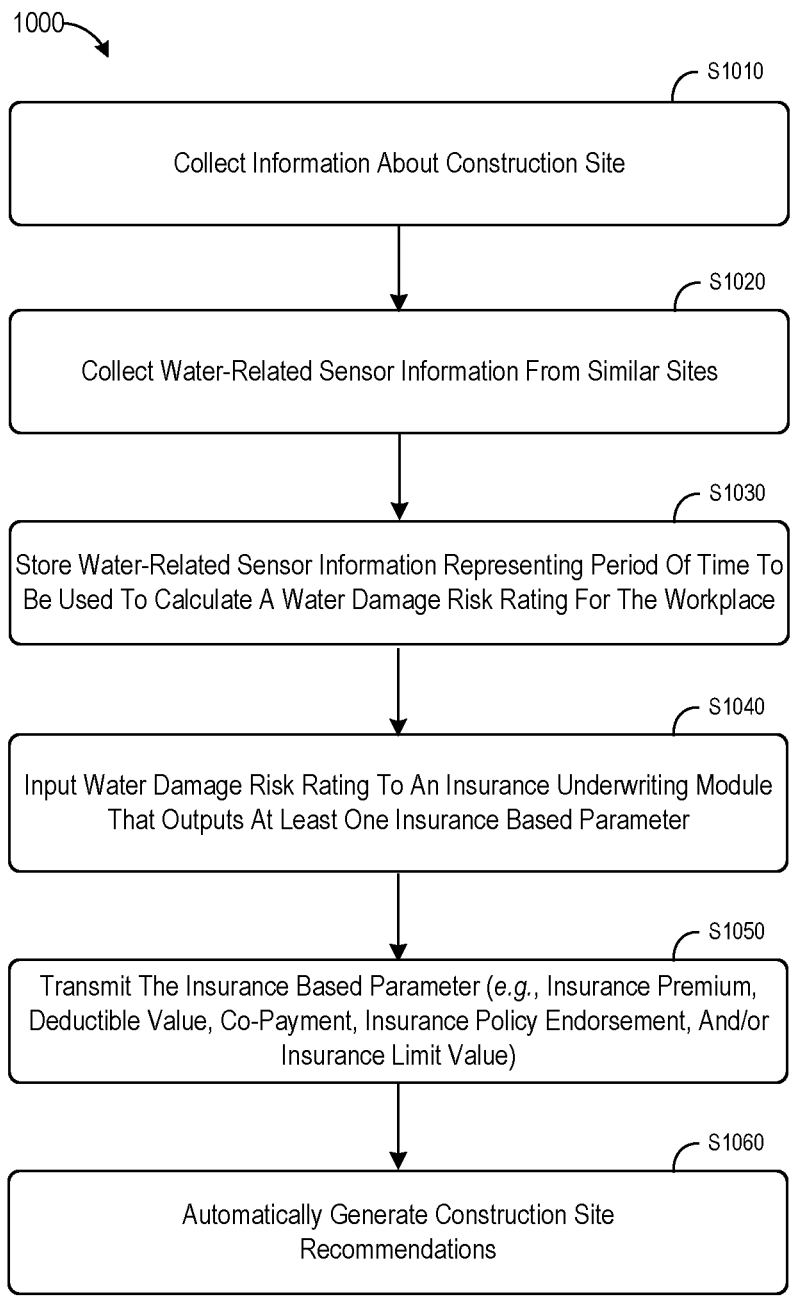
FIG. 10 illustrates an insurance rating method that might be performed in accordance with some embodiments.

According to some embodiments, an overall water damage rating may be used as an input to an insurance underwriting module that generates at least one insurance based parameter. FIG. 10 illustrates an insurance rating method 1000 that might be performed in accordance with some embodiments. At S1010, information about a site may be collected (e.g., associated with a type of industry, a building size, Building Code Effectiveness Grading ("BCEG") data, etc.). At S1020, water-related sensor information may be collected (e.g., in accordance with any of the embodiments described herein). At S1030, water-related sensor information may be stored to represent a period of time to be used to calculate a water damage risk rating for the site. For example, a numerical rating or a rating category might be automatically calculated (e.g., a site may receive a "yellow" light indicating a moderate risk of water damage). At S1040, the water damage risk rating is input to an insurance underwriting module that outputs at least one insurance based parameter. For example, the insurance underwriting module might automatically calculate an insurance premium based at least in part on the water damage rating. At S1050, the system transmits an indication of the insurance based parameter (e.g., associated with an insurance premium, a deductible value, a co-payment, an insurance policy endorsement, and/or an insurance limit value). For example, a site classified as "low risk" might receive a percent or fixed premium discount for water damage loss insurance (e.g., because fewer hearing-related claims might be expected as compared to "very risky" sites). At S1060, the system may automatically generate and transmit workplace and/or employee recommendations. For example, an enterprise analytics platform might automatically recommend that onsite equipment be moved to reduce the risk of water-damage loss. According to some embodiments, the system may also pre-populate data elements (e.g., associated with an insurance claim template) to improve the accuracy of the information and/or improve claim processing time.

Figure 11:
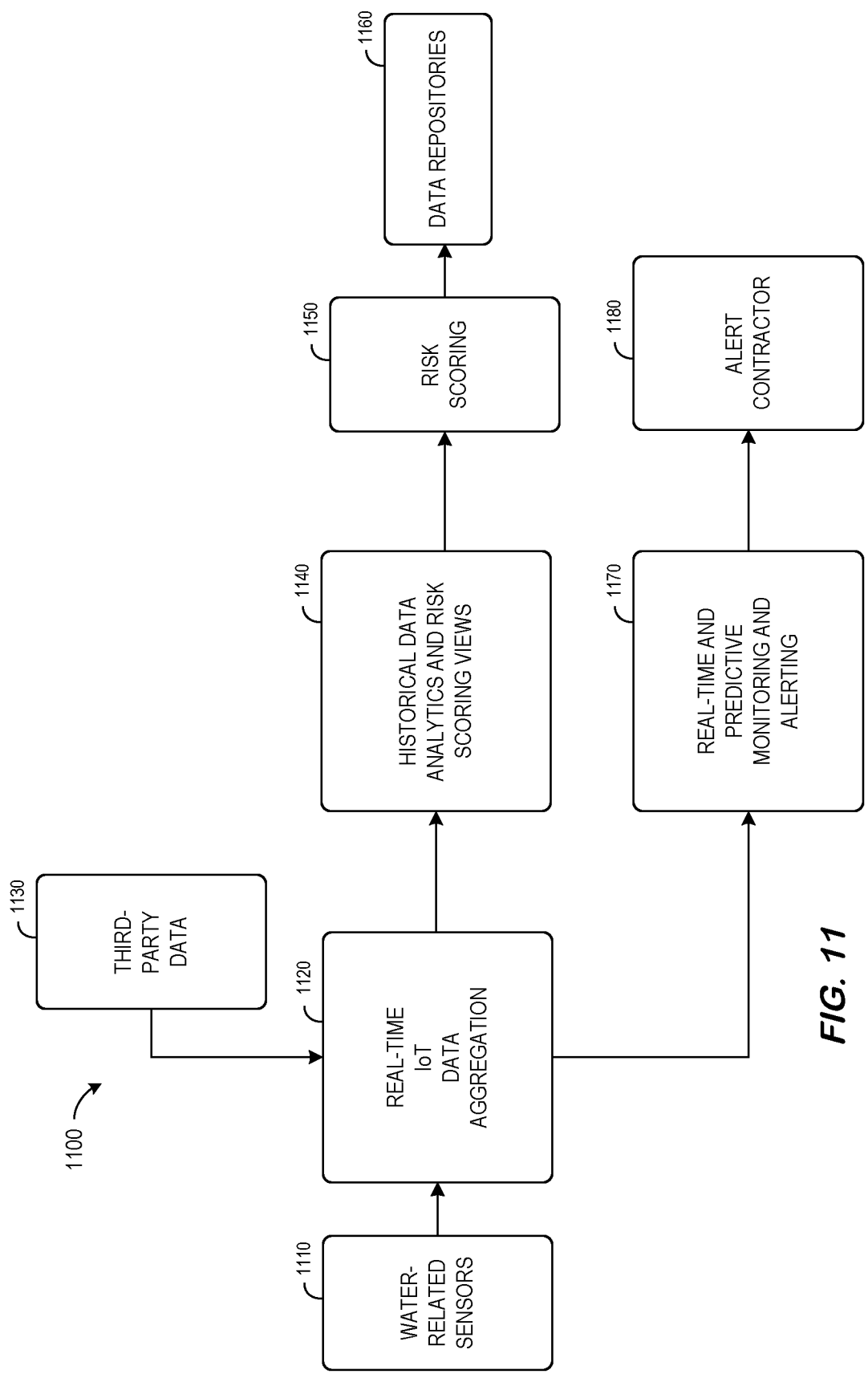
FIG. 11 is a water-related data monitoring Internet of Things approach according to some embodiments.

FIG. 11 is a water-related data Internet of Things ("IoT") approach 1100 according to some embodiments. At 1110, water-related sensors (including, in some embodiments, moisture sensing devices) may detect water information in substantially real time (sensors may also measure temperatures, water pressure, mold levels, real time video streams or thermal images, etc.). According to some embodiments, sensors may be mounted at fixed places in the site and an indoor positioning system may provide location information. For example, beacons (e.g., BLUETOOTH® protocol enabled beacons for indoor locations) may transmit a Universally Unique Identifier ("UUID") to IoT sensors/devices within range. The sensors may provide data to a real-time IoT data aggregation component 1120 through a secure transport and/or a cloud-based architecture (e.g., via a WI-FI® protocol connection, 3G or 4G cellular network, etc.). The data might include, for example, key sensor information including device type, location, and battery levels for each sensor. The real-time IoT data aggregation component 1120 may, according to some embodiments, also receive third-party data 1130, such as historical or current weather data, BCEG information, etc. The real-time IoT data aggregation 1120 might include, for example: registering and/or configuring IoT devices for a given customer or location; receiving real-time sensor data streamed for IoT devices; augmenting IoT data with real-time weather and other third-party data; etc.

Data that do not include Personally Identifiable Information ("PII") may then be sent to historical data analytics and risk scoring views 1140 (e.g., associated with an insurer who insures the site). Risk scoring 1150 may then be performed (e.g., for underwriting, risk engineering, and data science purposes) and provided to data repositories 1160 (e.g., storing insurance claims, actuary data, underwriting information, data science records, etc.).

Information from the real-time IoT data aggregation 1120 may also be provided to a real-time and predictive monitoring and alerting component 1170, which might perform cognitive learning and pattern recognition, generate analytics models to analyze sensor data, detect water damage risk and perform early detection tasks, and execute device status and monitoring. Note that an IoT network may be used to transfer the collected water-related data. For example, data may be transferred in accordance with a Message Queuing Telemetry Transport ("MQTT") light weight messaging protocol for use on top of the TCP/IP protocol. The IoT network may register/configure IoT devices for a given customer and/or location. The IoT network may also receive water-related data streamed directly from IoT devices. The real-time and predictive monitoring and alerting component 1170 may then transmit an alert to a contractor 1180, subcontractor, insurer, leasee, building owner, security service, etc. According to some embodiments, an entity might utilize a mobile application to view a live camera feed from the construction site and/or to reduce or stop water flow by sending a shut-down commend to one or more water valves.

Figure 12:
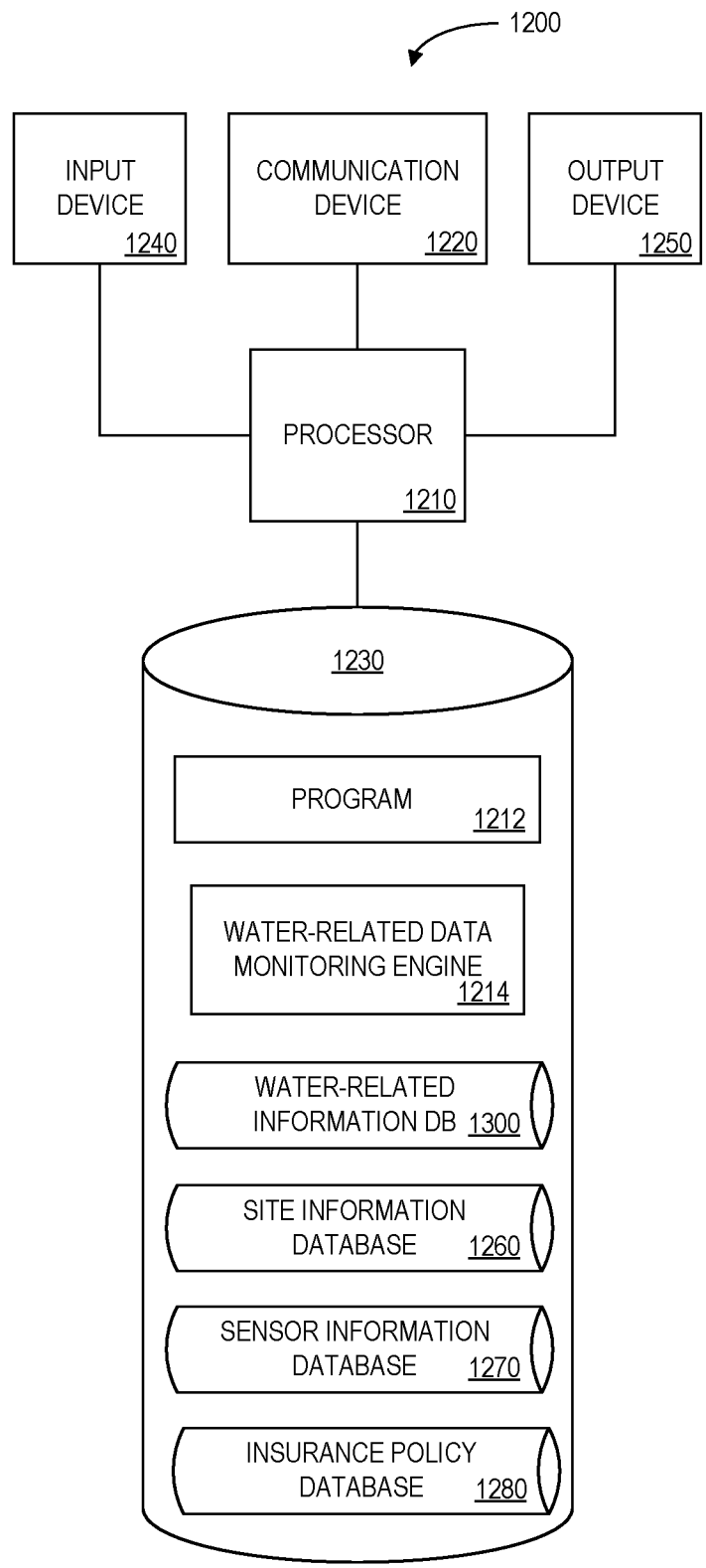
FIG. 12 is block diagram of a water monitoring tool or platform according to some embodiments of the present invention.

The embodiments described herein may be implemented using any number of different hardware configurations. For example, FIG. 12 illustrates an enterprise analytics platform 1200 that may be, for example, associated with the systems 100, 900 of FIGS. 1 and 9, respectively. The enterprise analytics platform 1200 comprises a processor 1210, such as one or more commercially available Central Processing Units (CPUs) in the form of one-chip microprocessors, coupled to a communication device 1220 configured to communicate via a communication network (not shown in FIG. 12). The communication device 1220 may be used to communicate, for example, with one or more remote water-related sensors, water information hubs, etc. Note that communications exchanged via the communication device 1220 may utilize security features, such as those between a public internet user and an internal network of the insurance enterprise. The security features might be associated with, for example, web servers, firewalls, and/or PCI infrastructure. The enterprise analytics platform 1200 further includes an input device 1240 (e.g., a mouse and/or keyboard to enter information about water-related sensors and/or a construction site) and an output device 1250 (e.g., to output reports regarding system administration, water event alerts, site modification recommendations, insurance policy premiums, etc.).

The processor 1210 also communicates with a storage device 1230. The storage device 1230 may comprise any appropriate information storage device, including combinations of magnetic storage devices (e.g., a hard disk drive), optical storage devices, mobile telephones, and/or semiconductor memory devices. The storage device 1230 stores a program 1212 and/or a water-related data monitoring engine or application 1214 for controlling the processor 1210. The processor 1210 performs instructions of the programs 1212, 1214, and thereby operates in accordance with any of the embodiments described herein. For example, the processor 1210 may receive from a water impact data store electronic records associated with prior water-related events at other sites along with water-related sensor location data for those sites. The processor 1210 may also receive third-party information and automatically analyze the electronic records to create a predictive analytics algorithm. The data associated with water at the site and the third-party information may then be automatically analyzed by the processor 1210 using the predictive analytics algorithm, and a result of the analysis may then be transmitted (e.g., to a party associated with the site or an on-site water shut-off valve).

The programs 1212, 1214 may be stored in a compressed, uncompiled and/or encrypted format. The programs 1212, 1214 may furthermore include other program elements, such as an operating system, a database management system, and/or device drivers used by the processor 1210 to interface with peripheral devices.

As used herein, information may be "received" by or "transmitted" to, for example: (i) the enterprise analytics platform 1200 from another device; or (ii) a software application or module within the enterprise analytics platform 1210 from another software application, module, or any other source.

In some embodiments (such as shown in FIG. 12), the storage device 1230 includes a water-related information database 1300, a site information database 1260 (e.g., storing information about an industry type, square footage, work schedules, etc.), a sensor information database 1270 (e.g., storing sensor types, IP addresses, site locations, etc.), and an insurance policy database 1280 (e.g., storing information about past water damage loss insurance claims, current premium values, etc.). An example of a database that may be used in connection with the enterprise analytics platform 1200 will now be described in detail with respect to FIG. 13. Note that the database described herein is only an example, and additional and/or different information may be stored therein. Moreover, various databases might be split or combined in accordance with any of the embodiments described herein. For example, the insurance policy database 1280 and/or water-related information database 1300 might be combined and/or linked to each other within the water related data monitoring engine 1214.

Figure 13:
FIG. 13 is a tabular portion of a water-related information database according to some embodiments.

Referring to FIG. 13, a table is shown that represents the water-related information database 1300 that may be stored at the enterprise analytics platform 1200 according to some embodiments. The table may include, for example, entries identifying water-related monitoring sample collections. The table may also define fields 1302, 1304, 1306, 1308, 1310 for each of the entries. The fields 1302, 1304, 1306, 1308, 1310 may, according to some embodiments, specify: a site location identifier 1302, an enterprise name 1304, a date/time 1306, water damage risk data 1308, and an alert indication 1310. The water-related information database 1300 may be periodically created and updated, for example, based on information electrically received from water-related sensors and/or a water information hub via a cloud-based application.

The site location identifier 1302 and enterprise name 1304 may be, for example, unique alphanumeric codes identifying a particular construction site location for an enterprise (e.g., associated with a latitude/longitude, X/Y coordinate, etc.). The date/time 1306 and water damage risk data 1308 might indicate a calculated level of risk at a particular time for a location. The alert indication 1310 might indicate whether or not an alert signal was transmitted responsive to the water damage risk data 1308. For example, as illustrated by the third entry in the table 1300, an alert 1310 might be generated when water damage risk data exceed "5.5" for a given location.

Figure 14:
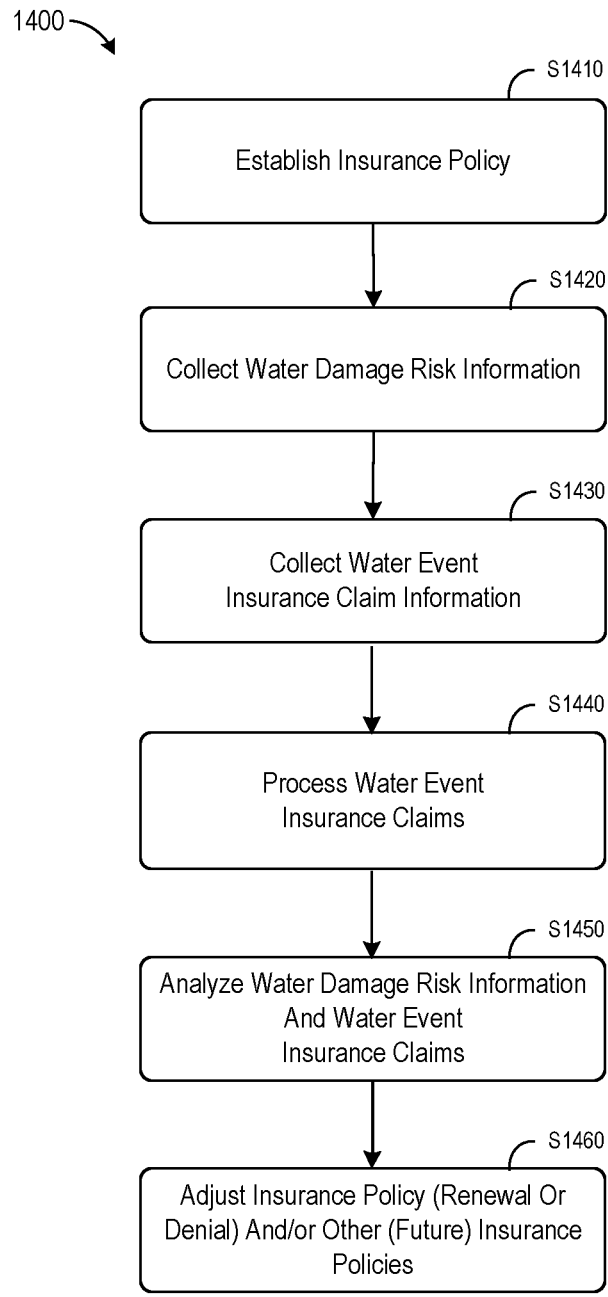
FIG. 14 illustrates an overall enterprise method that might be performed in accordance with some embodiments.

FIG. 14 illustrates an overall enterprise method 1400 that might be performed in accordance with some embodiments. At S1410, the enterprise may establish an insurance policy with an insured. For example, an insurance company may issue a water damage loss insurance policy to a business. At S1420, the enterprise (either directly or with the help of the insured) may collect water-related information. For example, the insurance company may measure the moisture and mold levels throughout a construction site along with water flow data. At S1430, the enterprise may collect water event insurance claim information (e.g., including amounts of loss and/or potential causes of the losses). At S1440, the enterprise may process water damage loss insurance claims (e.g., making payments to insured parties as appropriate). At S1450, the enterprise may analyze water-related information and water damage loss insurance claims. At S1460, the enterprise may adjust the insurance policy (e.g., including a decision to renew, or not renew, various insurance policies) and/or other (future) insurance policies. For example, the insurance company might lower (or raise) an existing premium, adjust underwriting guidelines for a particular industry, etc. According to some embodiments, the willingness and ability of an enterprise to implement and/or enforce water-related data collection might be indicative of an overall level of risk associated with that enterprise (e.g., associated with other types of insurance policies).

Figure 15:
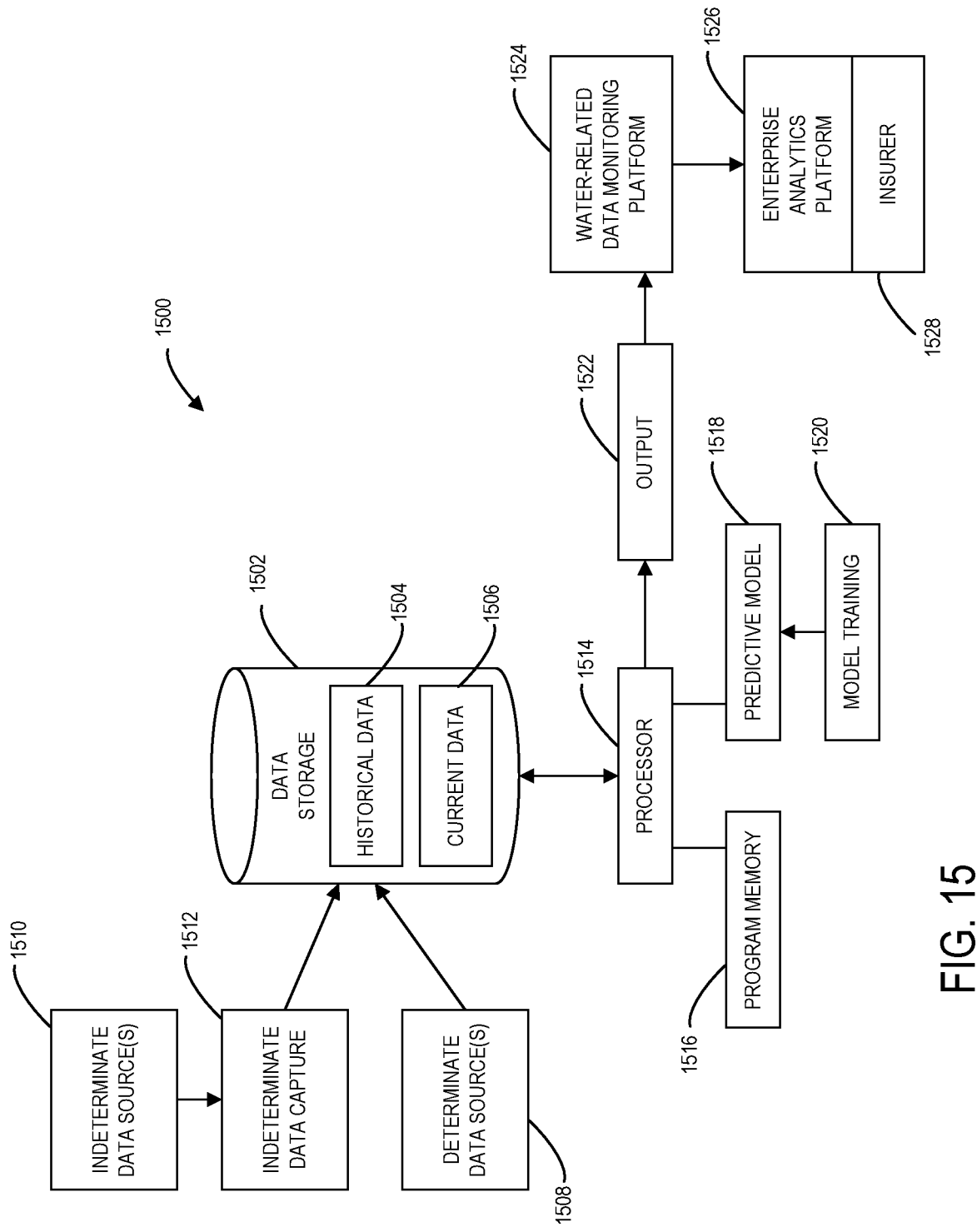
FIG. 15 illustrates a system associated with a predictive model according to some embodiments.

According to some embodiments, one or more predictive models may be used to generate noise models or help underwrite insurance policies and/or predict potential hearing damage based on prior events and claims. Features of some embodiments associated with a predictive model will now be described by first referring to FIG. 15. FIG. 15 is a partially functional block diagram that illustrates aspects of a computer system 1500 provided in accordance with some embodiments of the invention. For present purposes, it will be assumed that the computer system 1500 is operated by an insurance company (not separately shown) to support water-related data monitoring and processing.

The computer system 1500 includes a data storage module 1502. In terms of its hardware the data storage module 1502 may be conventional, and may be composed, for example, of one or more magnetic hard disk drives. A function performed by the data storage module 1502 in the computer system 1500 is to receive, store and provide access to both historical claim transaction data (reference numeral 1504) and current claim transaction data (reference numeral 1506). As described in more detail below, the historical claim transaction data 1504 are employed to train a predictive model to provide an output that indicates potential water damage patterns, and the current claim transaction data 1506 are thereafter analyzed by the predictive model. Moreover, as time goes by, and results become known from processing current claim transactions, at least some of the current claim transactions may be used to perform further training of the predictive model. Consequently, the predictive model may thereby adapt itself to changing event impacts and damage amounts.

Either the historical claim transaction data 1504 or the current claim transaction data 1506 might include, according to some embodiments, determinate and indeterminate data. As used herein and in the appended claims, "determinate data" refers to verifiable facts such as the age of a building; a building type; an event type (e.g., a burst pipe or flood); a date of loss, or date of report of claim, or policy date or other date; a time of day; a day of the week; a geographic location, address or ZIP code; and a policy number.

As used herein, "indeterminate data" refers to data or other information that are not in a predetermined format and/or location in a data record or data form. Examples of indeterminate data include narrative speech or text, information in descriptive notes fields and signal characteristics in audible voice data files. Indeterminate data extracted from medical notes or accident reports might be associated with, for example, an amount of loss and/or details about damages.

The determinate data may come from one or more determinate data sources 1508 that are included in the computer system 1500 and are coupled to the data storage module

1502. The determinate data may include "hard" data like a claimant's name, tax identifier umber, policy number, address; the date of loss; the date the claim was reported, etc. One possible source of the determinate data may be the insurance company's policy database (not separately indicated). Another possible source of determinate data may be from data entry by the insurance company's claims intake administrative personnel.

The indeterminate data may originate from one or more indeterminate data sources 1510, and may be extracted from raw files or the like by one or more indeterminate data capture modules 1512. Both the indeterminate data source(s) 1510 and the indeterminate data capture module(s) 1512 may be included in the computer system 1500 and coupled directly or indirectly to the data storage module 1502. Examples of the indeterminate data source(s) 1510 may include data storage facilities for document images, for text files (e.g., claim handlers' notes) and digitized recorded voice files (e.g., claimants' oral statements, witness interviews, claim handlers' oral notes, etc.). Examples of the indeterminate data capture module(s) 1512 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual. For example, claim handlers' opinions may be extracted from their narrative text file notes.

The computer system 1500 also may include a computer processor 1514. The computer processor 1514 may include one or more conventional microprocessors and may operate to execute programmed instructions to provide functionality as described herein. Among other functions, the computer processor 1514 may store and retrieve historical claim transaction data 1504 and current claim transaction data 1506 in and from the data storage module 1502. Thus, the computer processor 1514 may be coupled to the data storage module 1502.

The computer system 1500 may further include a program memory 1516 that is coupled to the computer processor 1514. The program memory 1516 may include one or more fixed storage devices, such as one or more hard disk drives, and one or more volatile storage devices, such as RAM devices. The program memory 1516 may be at least partially integrated with the data storage module 1502. The program memory 1516 may store one or more application programs, an operating system, device drivers, etc., all of which may contain program instruction steps for execution by the computer processor 1514.

The computer system 1500 further includes a predictive model component 1518. In certain practical embodiments of the computer system 1500, the predictive model component 1518 may effectively be implemented via the computer processor 1514, one or more application programs stored in the program memory 1516, and data stored as a result of training operations based on the historical claim transaction data 1504 (and possibly also data received from a third-party reporting service). In some embodiments, data arising from model training may be stored in the data storage module 1502, or in a separate data store (not separately shown). A function of the predictive model component 1518 may be to determine appropriate simulation models, results, and/or scores (e.g., a rating indicating how risky a construction site is as compared to similar sites). The predictive model component may be directly or indirectly coupled to the data storage module 1502.

The predictive model component 1518 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 1500 includes a model training component 1520. The model training component 1520 may be coupled to the computer processor 1514 (directly or indirectly) and may have the function of training the predictive model component 1518 based on the historical claim transaction data 1504 and/or information about noise events, incidents, and alerts. (As will be understood from previous discussion, the model training component 1520 may further train the predictive model component 1518 as further relevant data becomes available.) The model training component 1520 may be embodied at least in part by the computer processor 1514 and one or more application programs stored in the program memory 1516. Thus, the training of the predictive model component 1518 by the model training component 1520 may occur in accordance with program instructions stored in the program memory 1516 and executed by the computer processor 1514.

In addition, the computer system 1500 may include an output device 1522. The output device 1522 may be coupled to the computer processor 1514. A function of the output device 1522 may be to provide an output that is indicative of (as determined by the trained predictive model component 1518) particular water damage risk maps, events, insurance underwriting parameters, and recommendations. The output may be generated by the computer processor 1514 in accordance with program instructions stored in the program memory 1516 and executed by the computer processor 1514. More specifically, the output may be generated by the computer processor 1514 in response to applying the data for the current simulation to the trained predictive model component 1518. The output may, for example, be a monetary estimate, a water damage risk level, and/or likelihood within a predetermined range of numbers. In some embodiments, the output device may be implemented by a suitable program or program module executed by the computer processor 1514 in response to operation of the predictive model component 1518.

Still further, the computer system 1500 may include a water-related data monitoring platform 1524. The water-related data monitoring platform 1524 may be implemented in some embodiments by a software module executed by the computer processor 1514. The water-related data monitoring platform 1524 may have the function of rendering a portion of the display on the output device 1522. Thus, the water-related data monitoring platform 1524 may be coupled, at least functionally, to the output device 1522. In some embodiments, for example, the water-related data monitoring platform 1524 may direct workflow by referring, to an enterprise analytics platform 1526, work site recommendations, modification recommendations, underwriting parameters, and/or alerts generated by the predictive model component 1518 and found to be associated with various results or scores. In some embodiments, these data may be provided to an insurer 1528 who may modify insurance parameters as appropriate.

Figure 16:
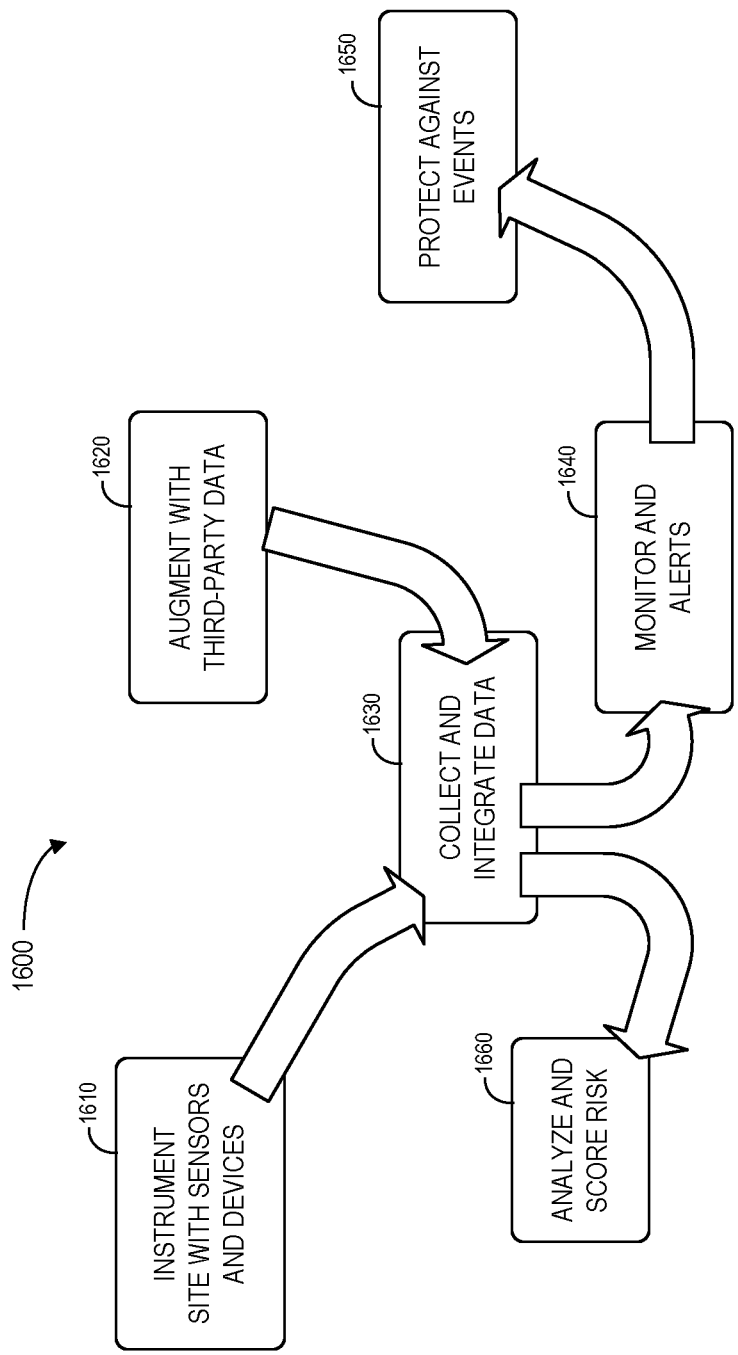
FIG. 16 is another construction or renovation water damage overview in accordance with some embodiments.

Thus, the computer system 1500 may be used to create one or more analytic models to help monitor and/or mitigate water damage risk. For example, FIG. 16 is another construction or renovation water damage overview 1600 according to some embodiments of the present invention. Initially, an entity (e.g., an insurance company) may instrument a construction site with sensors and devices 1610. The sensors might include, for example, moisture sensors to detect water on a floor, water flow measuring devices (perhaps including remotely controlled shutdown valves), etc. The sensors and devices 1610 might, according to some embodiments, include smart water meters, including those that use Advanced Metering Infrastructure ("AMI") and/or Automated Meter Reading ("AMR"). Such smart water meters may be used for the dual purposes of measuring and monitoring water flow. According to some embodiments, the sensors and devices 1610 may include mobile and/or autonomous devices (e.g., self-piloted drones or other robotics).

The information from the sensors may be augmented with third-party data 1620, such as weather data, US governmental flood zone maps, etc. The system may then collect and integrate the data 1630 using, for example Artificial Intelligence ("AI"), machine learning, or similar techniques. In this way, a process to monitor the data and generate alerts 1640 may be provided. For example, a contractor might be automatically notified of a potential problem so that he or she can take corrective action. As other examples, a site security firm and/or insurer might be automatically notified about a potential water event. In this way, the system may protect against water damage events 1650 including leaks, product defect failures, improper installation, sabotage, etc. The collected data may also be used to analyze and score risk 1660. For example, a water damage risk score might be calculated using analytics models to process sensor data, cognitive learning and pattern recognition to assess a future water damage risk situation, etc.

Figure 17:
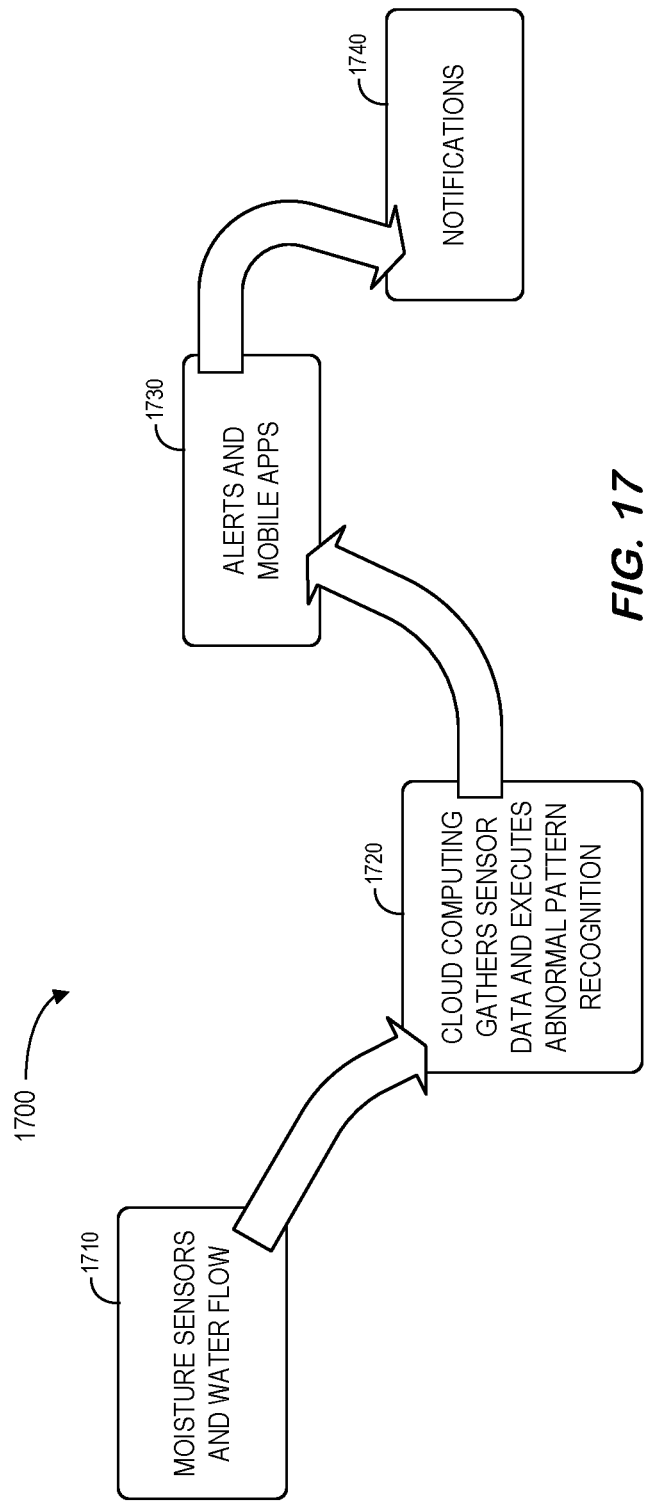
FIG. 17 illustrates an end-to-end water-related data monitoring flow in accordance with some embodiments.

FIG. 17 illustrates an end-to-end water-related data monitoring flow 1700 in accordance with some embodiments. Initially, moisture sensor and water flow devices 1710 (including intrusive and non-intrusive devices) may be installed at a construction site. Cloud computing may then gather sensor data and execute abnormal pattern recognition 1720. As a result, alerts (e.g., SMS, email, or smartphone alerts) 1730 may be generated. Similarly, a mobile computing application 1730 may allow for monitoring and/or for a control of water flow at the construction site. Finally, contractors and/or site owners may receive notifications 1740 so that correction action can be taken in a timely fashion. Similarly, security or management firms might be notified along with an insurer to facilitate an appropriate response to a potential water event.

Figure 18:
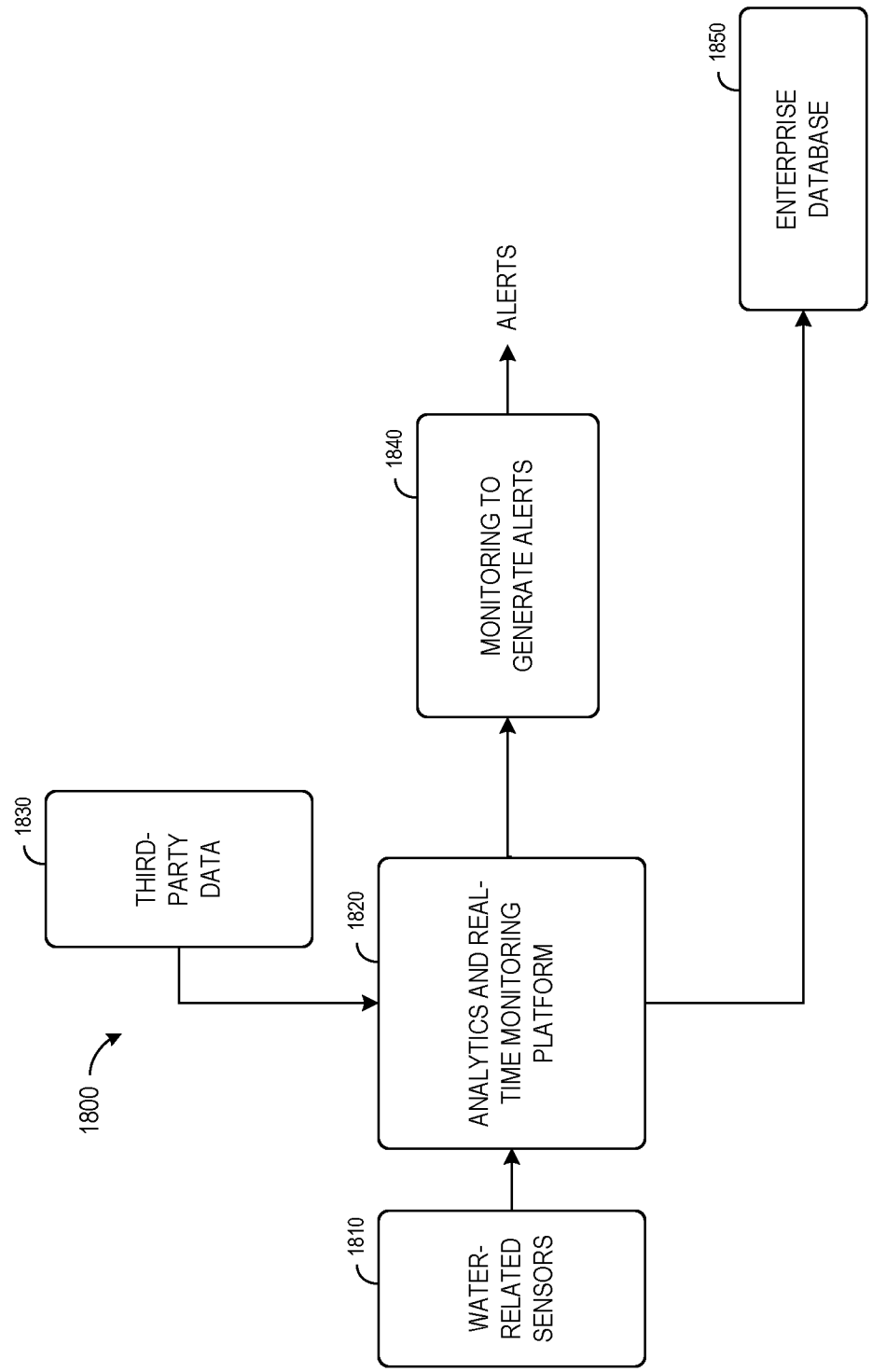
FIG. 18 is another water-related data monitoring Internet of Things approach according to some embodiments.

FIG. 18 is another water-related data monitoring IoT approach 1800 according to some embodiments. At 1810, water-related sensors (including, in some embodiments, moisture sensing devices) may detect water information in substantially real time (sensors may also measure temperatures, water pressure, mold levels, real time video streams or thermal images, etc.). According to some embodiments, sensors may be mounted at fixed places in the site and an indoor positioning system may provide location information. For example, beacons (e.g., BLUETOOTH® protocol enabled beacons for indoor locations) may transmit a UUID to IoT sensors/devices within range. The sensors may provide data to an analytics and real-time monitoring platform 1820 through a secure transport and/or a cloud-based architecture (e.g., via a WI-FI® protocol connection, 3G or 4G cellular network, etc.). The data might include, for example, key sensor information including device type, location, and battery levels for each sensor. The analytics and real-time monitoring platform 1820 may, according to some embodiments, also receive third-party data 1830, such as historical or current weather data, BCEG information, etc. The analytics and real-time monitoring platform 1820 might, for example: register and/or configure IoT devices for a given customer or location; receive real-time sensor data streamed for IoT devices; augment IoT data with real-time weather and other third-party data; etc. The system may then perform monitoring to generate alerts 1840. For example, the real-time monitoring platform 1820 might perform cognitive learning and pattern recognition, generate analytics models to analyze sensor data, detect water damage risk and perform early detection tasks, and execute device status and monitoring. According to some embodiments, information from the analytics and real-time monitoring platform may also be stored in an enterprise database 1850 (e.g., storing insurance claims, actuary data, underwriting information, data science records, etc.). Information in the enterprise database 1850 may then be used to pre-populate at least one data element in a template associated with a water event at the site (e.g., to partially fill out a water damage insurance claim form).

Thus, embodiments may provide an automated and efficient way to facilitate monitoring and processing of water-related data. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 19:
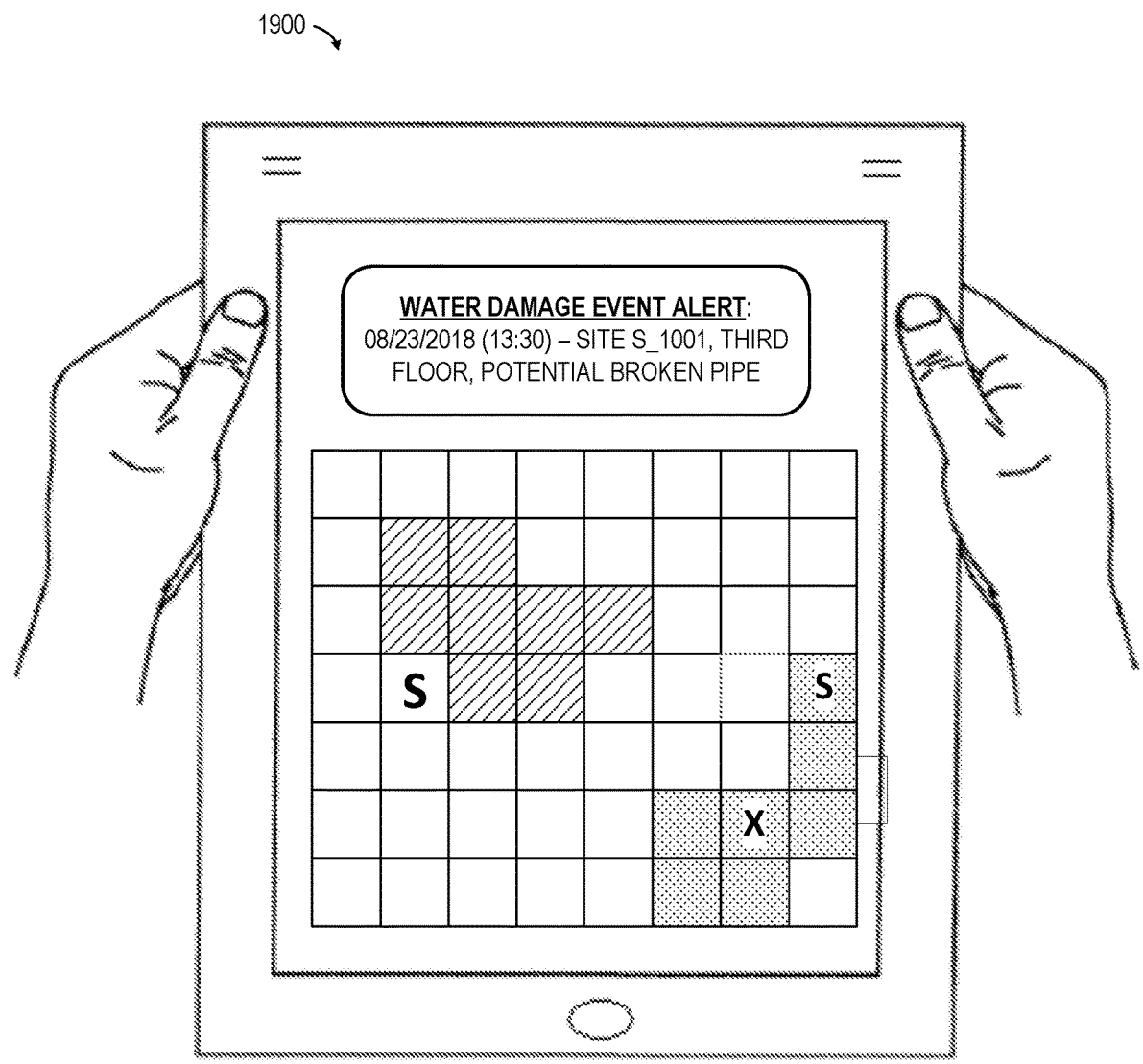
FIG. 19 illustrates an interactive operator display on a portable device in accordance with some embodiments.

Although specific hardware and data configurations have been described herein, note that any number of other configurations may be provided in accordance with embodiments of the present invention (e.g., some of the information associated with water events and/or events might be implemented as an augmented reality display and/or the databases described herein may be combined or stored in external systems). Moreover, although embodiments have been described with respect to water-related information, embodiments may instead be associated with other types of construction site protection. For example, embodiments might be used in connection with snowfall damage (e.g., by measuring roof stress), hail damage, wind damage, etc. Still further, the displays and devices illustrated herein are only provided as examples, and embodiments may be associated with any other types of user interfaces. For example, FIG. 19 illustrates a handheld alert and site map display 1900 according to some embodiments. According to some embodiments, elements of the display 1900 are selectable (e.g., via a touch screen) to adjust and/or see more information about that particular element.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system associated with a site, comprising:
a plurality of water-related sensors, each water-related sensor including:
an environmental characteristic sensor that senses an environmental characteristic,
a power source, and
a transmitter, coupled to the environmental characteristic sensor and the power source, that transmits data associated with water at the site via a first communication network;
a water impact data store containing electronic records associated with prior water-related events at other sites along with water-related sensor location data for those sites;
a third-party information interface that receives third-party information; and
a computer processor that:
(i) automatically analyzes the electronic records in the water impact data store to create a predictive analytics model trained via cognitive learning and pattern recognition to output one or more potential water damage patterns,
(ii) receives the data associated with water at the site and the third-party information,
(iii) automatically analyzes, in real-time, the data associated with water at the site and the third-party information using the predictive analytics model, and
(iv) transmits an indication of a result of the analysis, wherein the result is a water event cause including a predicted origination location of water and a water damage risk, wherein the indication is an alert that is transmitted based on the water damage risk exceeding a threshold value;
wherein the indication of the result of the analysis is used to pre-populate at least one data element in a template associated with a water event at the site, wherein the template is partially filled out by the pre-populated data element;
wherein different water-related sensors sense different environmental characteristics, including all of: water flowing through a pipe, mold, video of water information streamed from a camera, and water-related temperature.

2. The system of claim 1, wherein the different water-related sensors further sense all of: (i) moisture, (ii) a water-related thermal image, and (iii) audio information detected by a microphone.

3. The system of claim 2, wherein the third-party information is associated with at least one of: (i) historic data, (ii) flood information, (iii) precipitation data, (iv) hurricane information, (v) earthquake data, (vi) governmental information, and (vii) current data.

4. The system of claim 1, wherein the computer processor: (i) receives data from the plurality of water-related sensors via the first communication network, and (ii) transmits indications associated with the received data via a second communication network.

5. The system of claim 4, wherein the first communication network is a wireless communication network and the second communication network is the Internet.

6. The system of claim 5, wherein the computer processor is associated with a cloud-based computing architecture.

7. The system of claim 6, wherein the predictive analytics model is associated with at least one of: (i) an early detection model, (ii) a risk analysis, and (iii) a risk score.

8. The system of claim 6, wherein the indication transmitted by the computer processor comprises an electronic alert signal.

9. The system of claim 8, wherein the electronic alert signal is associated with at least one of: (i) an automated telephone call, (ii) an email message, and (iii) a text message.

10. The system of claim 8, wherein the electronic alert signal includes a potential cause of a water event and a recommended remedial action.

11. The system of claim 8, wherein the electronic alert signal is transmitted to an on-site water shut-down valve.

12. The system of claim 1, wherein the power source is associated with at least one of: (i) a battery, (ii) a rechargeable battery, and (iii) an Alternating Current ("AC") power adapter.

13. The system of claim 1, wherein the computer processor is further based on all of: (i) a construction schedule, (ii) a security schedule, (iii) fire protection data, and (iv) a multi-story floorplan.

14. The system of claim 1, wherein the indication transmitted by the computer processor facilitates rendering of an interactive graphical operator interface, the interactive graphical operator interface displaying a map-based presentation of water-related information.

15. The system of claim 14, wherein the interactive graphical operator information includes a location of a predicted water event at the site.

16. The system of claim 14, wherein selection of a location at the site via the interactive graphical operator interface results in a display of detailed water-related information about that location.

17. The system of claim 1, wherein the result of the analysis is to be used to calculate a water damage rating for an enterprise associated with the site.

18. The system of claim 17, wherein the water damage rating is associated with at least one of: an insurance premium, a deductible value, a co-payment, an insurance policy endorsement, and an insurance limit value.

19. A computerized method associated with a site, comprising:
collecting, from a plurality of water-related sensors, data associated with water at the site via a communication network, wherein each water-related sensor includes: (i) an environmental characteristic sensor to sense an environmental characteristic, (ii) a power source, and (iii) a transmitter, coupled to the environmental characteristic sensor and the power source, to transmit the data associated with water;
storing, in a water impact data store, electronic records associated with prior water-related events at other sites along with water-related sensor location data for those sites;
receiving, via a third-party information interface, third-party information;
automatically analyzing, by a computer processor, the electronic records in the water impact data store to create a predictive analytics model trained via cognitive learning and pattern recognition to output one or more potential water damage patterns;
automatically analyzing, by the computer processor in real-time, the data associated with water at the site and the third-party information using the predictive analytics model; and
transmitting an indication of a result of the analysis, wherein the result is a water event cause including a predicted origination location of water and a water damage risk, wherein the indication is an alert that is transmitted based on the water damage risk exceeding a threshold value;

wherein the indication of the result of the analysis is used to pre-populate at least one data element in a template associated with a water event at the site, wherein the template is partially filled out by the pre-populated data element; and wherein different water-related sensors sense different environmental characteristics, including all of: water flowing through a pipe, mold, video of water information streamed from a camera, and water-related temperature.

20. The method of claim 19, wherein the different water-related sensors further sense all of: (i) moisture, (ii) a water-related thermal image, and (iii) audio information detected by a microphone.

21. The method of claim 20, wherein the third-party information is associated with at least one of: (i) historic data, (ii) flood information, (iii) precipitation data, (iv) hurricane information, (v) earthquake data, (vi) governmental information, and (vii) current data.

22. A system associated with a construction site, comprising:

a plurality of water-related sensors, each water-related sensor including:
  an environmental characteristic sensor that senses an environmental characteristic,
  a power source, and
  a transmitter, coupled to the environmental characteristic sensor and the power source, that transmits data associated with water at the construction site via a wireless communication network;

a computer processor that: (i) receives data from the plurality of water-related sensors via the wireless communication network, and (ii) transmits indications associated with the received data via the Internet;

a water impact data store containing electronic records associated with prior water-related events at other sites along with water-related sensor location data for those sites;

a third-party information interface that receives third-party information; and a computer processor that:
  (i) automatically analyzes the electronic records in the water impact data store to create a predictive analytics model trained via cognitive learning and pattern recognition to output one or more potential water damage patterns,
  (ii) receives the data associated with water at the site and the third-party information,
  (iii) automatically analyzes, in real-time, the data associated with water at the construction site and the third-party information using the predictive analytics model, and
  (iv) transmits an electronic alert signal as a result of the analysis, wherein the result is a water event cause including a predicted origination location of water and a water damage risk, wherein the electronic alert signal is transmitted based on the water damage risk exceeding a threshold value;

wherein the result of the analysis is used to pre-populate at least one data element in a template associated with a water event at the site, wherein the template is partially filled out by the pre-populated data element;
and an on-site water shut-down valve that receives the electronic alert signal and automatically prevents a flow of water, wherein different water-related sensors sense different environmental characteristics, including all of: water flowing through a pipe, mold, video of water information streamed from a camera, and water-related temperature.

23. The system of claim 22, wherein the predictive analytics model is further based on all of: (i) a construction schedule, (ii) a security schedule, (iii) fire protection data, and (iv) a multi-story floorplan.

* * * * *